United States Patent
Finley et al.

(10) Patent No.: US 11,617,382 B2
(45) Date of Patent: *Apr. 4, 2023

(54) PALATABLE FOODS FOR A METHIONINE-RESTRICTED DIET

(71) Applicant: Board of Supervisors of Louisiana State University and Agricultural and Mechanical College, Baton Rouge, LA (US)

(72) Inventors: John W. Finley, Lakewood Ranch, FL (US); Thomas Gettys, Baton Rouge, LA (US); Frank L. Greenway, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 197 days.

This patent is subject to a terminal disclaimer.

(21) Appl. No.: 17/123,715

(22) Filed: Dec. 16, 2020

(65) Prior Publication Data

US 2021/0100268 A1   Apr. 8, 2021

Related U.S. Application Data

(63) Continuation of application No. 14/895,397, filed as application No. PCT/US2014/040790 on Jun. 4, 2014, now Pat. No. 10,897,921.
(Continued)

(51) Int. Cl.
*A23L 5/20* (2016.01)
*A23G 9/32* (2006.01)
(Continued)

(52) U.S. Cl.
CPC .............. *A23L 5/25* (2016.08); *A23G 9/32* (2013.01); *A23K 20/147* (2016.05); *A23L 2/66* (2013.01);
(Continued)

(58) Field of Classification Search
CPC .......... A23L 33/10; A23L 7/196; A23L 15/30; A23L 19/12; A23L 5/276; A23L 2/66;
(Continued)

(56) References Cited

U.S. PATENT DOCUMENTS

2003/0129262 A1   7/2003   Epner et al. ............... 424/94.63

FOREIGN PATENT DOCUMENTS

EP   0560989 A1   9/1993

OTHER PUBLICATIONS

Ables, G. et al., "Methionine-restricted C57BL/6J mice resistant to diet-induced obesity and insulin resistance but have low bone density," PloS One, vol. 7, No. 12, e51357 (2012).
(Continued)

*Primary Examiner* — Subbalakshmi Prakash
(74) *Attorney, Agent, or Firm* — John H. Runnels

(57) ABSTRACT

A method is disclosed for making palatable methionine-restricted foods, to deliver a methionine-restricted diet to human or veterinary patients. A protein or a food product containing protein is partially oxidized, preferably with ozone, to oxidize nearly all of the methionine and cysteine. After oxidation, tryptophan and lysine are optionally added back since they tend to be oxidized also. Optionally, a small amount of methionine is also added back so that the final methionine is within a preferred range of about 0.85 to about 1.8 gram methionine per 100 gram total protein, preferably about 1.2 gram per 100 gram total protein.

19 Claims, 10 Drawing Sheets

Related U.S. Application Data

(60) Provisional application No. 61/831,189, filed on Jun. 5, 2013.

(51) Int. Cl.

| | |
|---|---|
| *A23L 2/66* | (2006.01) |
| *A23K 20/147* | (2016.01) |
| *A23L 13/50* | (2016.01) |
| *A23L 33/00* | (2016.01) |
| *A23L 33/10* | (2016.01) |
| *A23L 33/175* | (2016.01) |
| *A23L 7/109* | (2016.01) |
| *A23L 7/196* | (2016.01) |
| *A23L 33/17* | (2016.01) |
| *A23L 19/12* | (2016.01) |
| *A23L 13/40* | (2016.01) |
| *A23L 15/00* | (2016.01) |
| *A23L 33/19* | (2016.01) |

(52) U.S. Cl.
CPC ............... *A23L 5/27* (2016.08); *A23L 5/276* (2016.08); *A23L 7/109* (2016.08); *A23L 7/196* (2016.08); *A23L 13/40* (2016.08); *A23L 13/50* (2016.08); *A23L 15/30* (2016.08); *A23L 19/12* (2016.08); *A23L 33/10* (2016.08); *A23L 33/17* (2016.08); *A23L 33/175* (2016.08); *A23L 33/19* (2016.08); *A23L 33/30* (2016.08); *A23L 33/40* (2016.08); *A23V 2002/00* (2013.01)

(58) Field of Classification Search
CPC . A23L 33/40; A23L 5/27; A23L 33/17; A23L 33/19; A23L 5/25; A23L 13/50; A23L 33/30; A23L 7/109; A23L 33/175; A23L 13/40; A23K 20/147; A23G 9/32; A23V 2002/00; A23V 2200/328; A23V 2200/332; A23V 2250/0632; A23V 2250/54246
USPC .......................................................... 426/2
See application file for complete search history.

(56) References Cited

OTHER PUBLICATIONS

Davies, M. et al., "The oxidative environment and protein damage," Biochimica et Biophysica Acta (BBA)—Proteins and Proteomics, vol. 1703, pp. 93-109 (2005).
Fukayama, M. et al., "Reactions of aqueous chlorine and chlorine dioxide with model food compounds," Environmental Health Perspectives, vol. 69, pp. 267-274 (1986).
Gomez, C. et al., "Forty percent and eighty percent MR decrease mitochondrial ROS generation and oxidative stress in rat liver," Biogerontology, vol. 9, No. 3, pp. 183-196 (2008).
Gomez, C. et al., "Forty percent methionine restriction decreases mitochondrial oxygen radical production and leak at complex 1 during forward electron flow and lowers oxidative damage to proteins and mitochondrial DNA in rat kidney and brain mitochondria," Rejuvenation Res., vol. 12, No. 6, pp. 421-434 (2009).
Impey, S. G. et al., "Nutritive value of bread made from flour treated with chlorine dioxide," British Medical Journal, vol. 5251, No. 2, pp. 553-556 (1961).
Khadre, M. et al., "Microbiological aspects of ozone applications in food; a review", Journal of Food Science, vol. 66, pp. 1242-1252 (2001).
Malloy, V. et al., "Methionine restriction prevents the progression of hepatic steatosis in leptin-deficient obese mice," Metobolism, vol. 62, pp. 1651-1661 (2013).
Orentreich, N. et al., "Low methionine ingestion by rats extends life span," Journal of Nutrition, vol. 1050, pp. 269-274 (1993).
Plaisance, E.P. et al., "Dietary methionine restriction increases fat oxidation in obese adults with metabolic syndrome," J. Clin. Endocrinol Metab., vol. 96, No. 5, pp. E836-E840 (2011).
Sanchez-Roman, I. et al., "Forty percent methionine restriction lowers DNA methylation, complex 1 ROS generation, and oxidative damage to mtDNA and mitochondrial proteins in rat heart," J. Bioenerg. Biomembr., vol. 43, No. 6, pp. 699-708 (2011).
Sharma, V. et al., "Oxidation of amino acids, peptides and proteins by ozone: a review," Ozone: Science and Engineering, vol. 32, pp. 81-90 (2010).
Tkachuk, R., "Amino acid composition of wheat flours," Cereal Chem., vol. 43, pp. 207-210 (1966).
Wu, Y. Victor, "Oats and their dry-milled fractions. Protein isolation and properties of four varieties," Journal of Agricultural and Food Chemistry, vol. 20, No. 4, pp. 757-761 (1972).
Elshorbagy, A. et al., "Cysteine supplementation reverses methionine restriction effects on rat adiposity: significance of stearoyl-coenzyme A desaturase," *J. Lipid Res.*, vol. 52, pp. 104-112 (2011).
Ewart, J., "Action of glutaraldehyde, nitrous acid or chlorine on wheat proteins," *J. Sci. Fd. Agric.*, vol. 19, pp. 370-373 (1968).

PALATABLE FOODS FOR A METHIONINE-RESTRICTED DIET

This is a continuation of U.S. patent application Ser. No. 14/895,397, filed Dec. 2, 2015, now allowed with the issue fee paid; which is the United States national stage of international application PCT/US2014/040790, international filing date Jun. 4, 2014, which claimed the benefit of the Jun. 5, 2013 filing date of U.S. provisional patent application Ser. No. 61/831,189 under 35 U.S.C. § 119(e). The complete disclosure of each of these priority applications is hereby incorporated by reference in its entirety This invention was made with Government support under grant number R01 DK096311 awarded by the National Institutes of Health. The government has certain rights in the invention.

TECHNICAL FIELD

This invention pertains to compositions and methods for improving the taste of methionine-restricted foods for individuals on a methionine-restricted diet.

BACKGROUND ART

Restriction of the essential amino acid methionine in rodent diets limits weight gain, improves insulin sensitivity, lengthens lifespan, and slows the rate of malignant tumor growth. Similar effects are expected in humans. In rats, dietary methionine restriction also reduces visceral fat deposition while reducing levels of circulating and tissue lipids. Similar effects are expected in humans. Overall, dietary methionine restriction produces a highly beneficial metabolic profile, including significant improvements in biomarkers of metabolic disease. In humans, visceral fat is particularly dangerous because it is associated with increased risk of heart disease. A methionine-restricted (MR) diet helps to limit abdominal fat deposition, to accelerate weight loss, and to enhance quality of life. When metastatic cancer patients have been fed MR diets they have lost weight, with no observed adverse effects.

Methionine restriction in previous clinical studies has used a medical food called Hominex®-2 that is made from elemental amino acids but that lacks methionine. Hominex®-2 supplies the daily protein requirements of the patients. Both short-term and long-term adherence to this diet is difficult because the Hominex®-2 has a very unpleasant taste. The potential benefits of dietary MR have been limited by the unavailability of palatable foods that are lacking in, or that are very low in methionine.

An "Elemental Control" diet is considered to be one containing methionine at a concentration of about 8.6 g methionine per kg of food, and containing zero or insignificant amounts of cysteine. The sum of all essential and nonessential amino acids in a diet containing 140.5 g of amino acids/kg is the equivalent of a diet containing 14% protein. Thus 8.6 g methionine per kg of food with such a diet is equivalent to 6.1 g methionine per 100 g total protein.

Previous dietary formulations that have restricted methionine to a level of a 5.16 g/kg diet (~3.7 g per 100 g total protein) have been reported as having biological efficacy, but we have evidence that this relatively modest degree of MR may be ineffective at producing beneficial metabolic results.

In previous approaches, an MR diet has typically been made by mixing free amino acids, and using the free amino acid mixture as a substitute primary protein source. No common, naturally occurring protein sources would be useful to produce the degree of MR needed to induce the desired biological effects—although it may be possible to design a complete vegetarian diet (devoid of dairy products) that would significantly restrict methionine and cysteine intake. Most naturally-occurring animal-derived proteins are simply too high in methionine. A few naturally-occurring animal-derived proteins, such as collagens, are low in methionine, but they are also deficient in other essential amino acids. Soy protein and some grain proteins are moderately low in methionine, but not low enough to induce the desired biological effects.

Using diets manufactured from elemental amino acids, previous studies in rats and mice have shown that lowering methionine from 0.86% grams of methionine per kilogram of diet (i.e., the "Elemental Control" diet, or 6.1 g methionine per 100 g total protein) to 0.17% (1.2 g methionine per 100 g total protein) produces a coordinated series of biological responses that include hyperphagia, increased energy expenditure, reduced fat deposition, enhanced insulin sensitivity, and increased lifespan.

(Note regarding certain units: The preferred manner of expressing the levels in a food of a particular amino acid such as methionine, cysteine, lysine, tryptophan, etc. is as grams of the amino acid per 100 grams total protein. In some instances, however, different units have been used, both in the present specification and in priority application Ser. No. 61/831,189. Specifically, levels of amino acids have sometimes been expressed as percent of diet. Where the latter measure has been used, the "diet" in question refers to the dry mass of the complete diet, where the complete diet also includes further components in addition to proteins or amino acids. For example, in some instances total protein or total amino acids constitute about 140.5 gram per kilogram of diet; and when that is the case, the numerical factor to convert units from "percent of diet" to "grams per 100 grams total protein" is 0.1405. For example, in such a case (140.5 g total protein/amino acids per kilogram total diet), a food in which methionine is 0.86% of total diet has 0.86÷0.1405=6.1 gram methionine per 100 gram total protein. In this context, the mass of "total protein" should be understood to refer to the dry mass of all proteins, peptides, and free amino acids in the food.)

The beneficial physiological and metabolic responses to dietary MR occur when normal levels of methionine (e.g., ~4 to 6 grams per 100 grams total protein) are reduced to low levels (e.g., 0.85 grams per 100 grams total protein), but not when methionine is completely absent from the diet (which would create an unhealthy and potentially even dangerous situation). Restriction of dietary methionine much below ~0.85 grams per 100 grams total protein initiates behavioral and physiological responses similar to those produced by diets devoid of an essential amino acid. For example, mice subjected to short-term (e.g. 7 or 17 d) deprivation of an essential amino acid show food aversion, together with a significant increase in energy expenditure. Studies of essential amino acid deprivation beyond 3 weeks are typically not permitted or possible because of extensive weight loss and increased mortality, so most work on essential amino acid deprivation examines responses after 7 d on the diet.

In previous studies, mice on diets lacking an essential amino acid have decreased food intake by 20-30% in the first 4 h after introduction of the imbalanced diet, and have maintained the lowered rate of consumption after 7 d and 17 d. The significant decrease in energy intake is accompanied by increased sympathetic outflow to adipose tissues and increased lipid mobilization and oxidation, and uncoupled respiration. The combination of decreased energy intake and increased energy expenditure has a profound effect on energy balance: After 7 days body weight is reduced by ~15-20%, and adipose tissue mass is 2- to 3-fold lower. For example, after 17 days of leucine deprivation, body weight is 30% lower and virtually no dissectible fat mass remains.

The lower limit for obtaining the benefit of dietary MR has been determined to be about 0.85 grams per 100 grams total protein. A related question is where lies the upper limit of methionine levels to obtain the beneficial responses seen at 1.2 grams per 100 grams total protein. Other dietary formulations that have restricted methionine in the range of 0.4-0.5% (percent of total diet) have been reported to be effective, but these findings have not been independently confirmed. Indeed, observations in our laboratory have indicated that lowering dietary methionine to 2.4 grams per 100 grams total protein has resulted in no observable changes in phenotype, none of the beneficial responses expected for a lower methionine diet. Studies in our own laboratories have experimentally determined that the upper limit is about 1.8 grams per 100 grams total protein; and at this level of restriction the diet is only about 50% as effective as restriction to 1.2 grams per 100 grams total protein (unpublished data).

See C. Gomez et al., "Forty percent and eighty percent MR decrease mitochondrial ROS generation and oxidative stress in rat liver," *Biogerontology*. 2008 June; 9(3):183-96; C. Gomez et al., "Forty percent methionine restriction decreases mitochondrial oxygen radical production and leak at complex I during forward electron flow and lowers oxidative damage to proteins and mitochondrial DNA in rat kidney and brain mitochondria," *Rejuvenation Res.* 2009 December; 12(6):421-34; and I. Sanchez-Roman et al., "Forty percent methionine restriction lowers DNA methylation, complex I ROS generation, and oxidative damage to mtDNA and mitochondrial proteins in rat heart," *J. Bioenerg. Biomembr.* 2011 December; 43(6):699-708; G. Ables et al., "Methionine-restricted C57BL/6J mice are resistant to diet-induced obesity and insulin resistance but have low bone density," *PLoS One* 7(12): e51357. Doi:10.1371/journalpone.0051357; V Malloy et al., "Methionine restriction prevents the progression of hepatic steatosis in leptin-deficient obese mice," *Metabolism*, vol. 62, pp. 1651-1661 (2013).

In a human clinical study Hominex®-2, a commercially available medical food that is a mixture of amino acids, was used to limit dietary methionine. (See Plaisance, E. P.; Greenway, F L; Boudreau, A; Hill, K A; Johnson, W D; Krajcik, R A; Perrone, C E; Orentreich, N; Cefalu, W T; Gettys, T W: Dietary methionine restriction increases fat oxidation in obese adults with metabolic syndrome. *J Clin Endocrinol Metab* 96(5):E836-E840, 2011.) Despite the low-methionine diet, serum methionine and cystine/cysteine concentrations in the MR group were only 14% and 10% lower, respectively, than in the control group. It is possible that the poor palatability of the Hominex® diet led to dietary non-compliance and consumption of other foods containing methionine. An alternative possibility is that the impact of dietary MR was mitigated by methionine mobilized from tissue reserves. For example, both groups lost about 2 kg of fat-free mass during the 16-week study. Another possibility is that the lack of efficacy may have been due to the previously unrecognized need to restrict or eliminate cystine/cysteine in the diet.

Both hydrogen peroxide and ozone can be used to oxidize methionine, and thereby lower methionine levels in food. Tests show that even a trace of residual peroxide impairs the palatability of food products. However, residual ozone does not impair the palatability of ozone-treated foods. See generally V. Sharma et al., "Oxidation of amino acids, peptides and proteins by ozone: a review," *Ozone: Science and Engineering*, vol. 32, pp. 81-90 (2010); and M. Khadre et al., "Microbiological aspects of ozone applications in food: a review," *Journal of Food Science*, vol. 66, pp. 1242-1252 (2001).

There is an unfilled need for more palatable methionine-restricted foods, and methods of making such foods to deliver a low-methionine diet to human or veterinary patients who would benefit from such a diet.

DISCLOSURE OF THE INVENTION

We have discovered more palatable methionine-restricted foods and methods of making more palatable methionine-restricted foods. These foods may be used to deliver a low-methionine diet to human or veterinary patients who would benefit from such a diet, for example, cancer patients, patients seeking to improve insulin sensitivity, patients seeking to control obesity, patients with cardiovascular disease, or patients seeking to prolong life. Dietary methionine restriction (MR) in accordance with the present invention involves restricting dietary methionine from normal levels of ~6 grams per 100 grams total protein, preferably to a range between about 0.85 and about 1.8 grams methionine per 100 grams total protein, with an optimal level about 1.2 grams methionine per 100 grams total protein, to achieve beneficial metabolic responses.

In a preferred embodiment, a protein or a food product containing protein is partially oxidized, preferably with ozone, to oxidize most or all of the methionine and cysteine in the protein. The sulfur-containing amino acids methionine and cysteine are more easily oxidized than are the other essential amino acids; and tryptophan is also relatively easily oxidized. After oxidation, tryptophan is added back since it tends to be oxidized along with the methionine and cysteine. If needed, a small amount of methionine is also added back to bring the final methionine content within the range of about 0.85 to about 1.8 grams methionine per 100 grams total protein. A diet completely devoid of all methionine has unfavorable health consequences, so it is strongly preferred to have this low, but non-zero target range of methionine in the treated protein. Some lysine may also be added back, because lysine is also subject to mild oxidation under the conditions used to deplete methionine. It is preferred, however, to add no cysteine back to the protein. Then the modified, low-methionine food product may be fed to a human or animal in need of a methionine-restricted (MR) diet, such as a patient with obesity, metabolic disease, or cancer.

MODES FOR CARRYING OUT THE INVENTION

Figure 1:
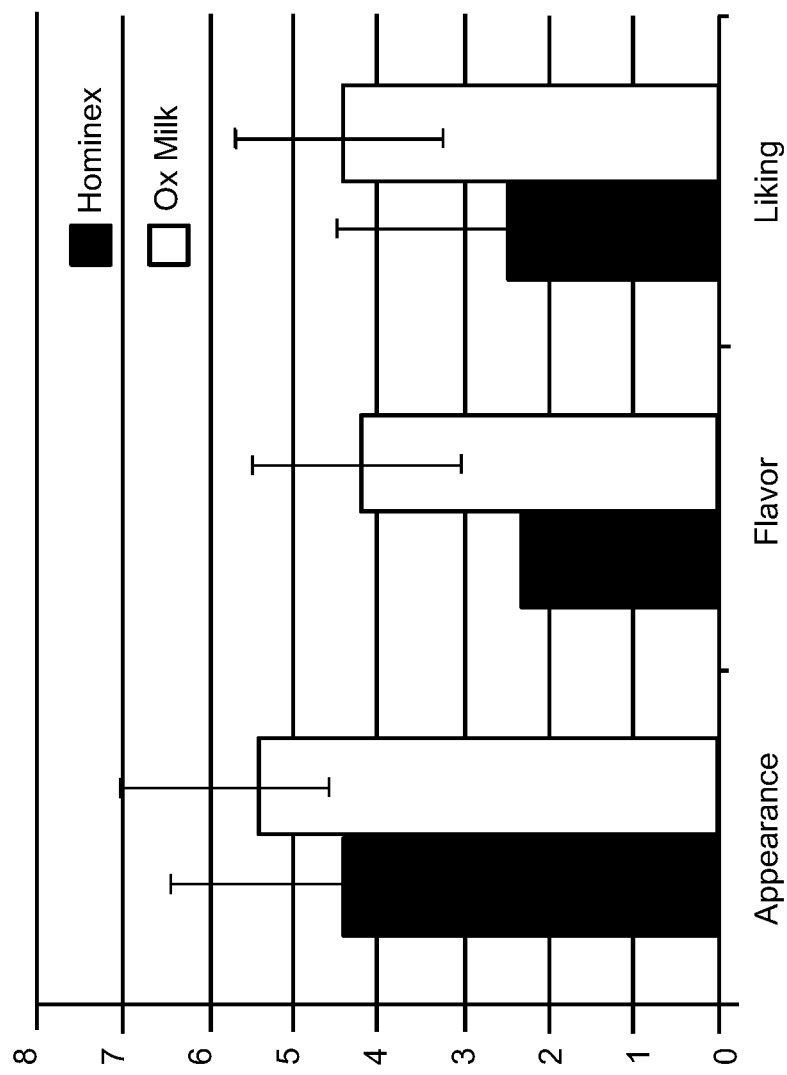
FIG. 1 depicts the appearance, taste, and liking of Hominex®-2 versus oxidized milk.

We have discovered a method to produce a palatable low-methionine diet that is based on the partial oxidation of protein, particularly the oxidation of methionine and cystine/cysteine in a naturally occurring protein. A significant advantage of this approach is that the proteins retain better palatability. Previous low-methionine diets, which have been based on mixtures of individual free amino acids, are highly unpalatable. Using proteins that have been partially oxidized by ozone or hydrogen peroxide, one can produce palatable food products that can be used in low-methionine diets. The methionine used in the present invention may range from about 0.85 to about 1.8 grams methionine per 100 grams total protein, and it is preferred to be in the middle of this range, i.e., about 1.2 grams methionine per 100 grams total protein.

We have demonstrated that ozone or hydrogen peroxide can be used to oxidize methionine to methionine sulfoxide in foods and in food ingredients. For example, when skim milk or liquid egg whites are heated at conventional pasteurization temperatures in the presence of 4% to 9% hydrogen peroxide, over 90% of the methionine is converted to the sulfoxide. An optional, but preferred subsequent vacuum treatment step reduces the water level to bring the total solids concentration back to the original levels.

A low methionine diet using otherwise conventional food products can be prepared when the ingredients or the proteins are oxidized to convert methionine to methionine sulfoxide. When methionine is oxidized, the essential amino acid tryptophan also tends to be oxidized. Thus, the products are preferably supplemented with sufficient tryptophan to bring tryptophan levels back to about 5 to 7 grams per 100 grams total protein. Lysine may be partially oxidized, so some supplementation with lysine may also be desirable. Optionally, the oxidation process may be stopped at a point when methionine and tryptophan are at desirable levels, potentially resulting in cost savings. Optionally, the products may also be supplemented with any other nutrients that may be affected by oxidation, e.g., ascorbic acid, tocopherols, other fat-soluble vitamins, other antioxidants, pigments, fats, and oils As examples, we have shown that samples of beans, milk, eggs, pasta, brown rice, spaghetti sauce, gravy mix, chili seasoning, and spaghetti seasoning can be treated with 10% to 30% hydrogen peroxide (v/v), heated to 93° C., and then allowed to sit for 8 hours at 4° C. to oxidize the methionine in the samples. Samples were then treated with peroxidase (5 mg/25 ml) and left to sit at 4° C. for 12 hours to remove the peroxide from the samples, which improves palatability. The resulting food samples were analyzed for amino acid content, and were shown to have low methionine and low cystine/cysteine. Low cystine/cysteine is preferred because of the methionine-sparing effects of cysteine. Diets that restrict methionine without eliminating cysteine will not be as effective in producing metabolic benefits. Thus, in our experiments, the sulfur-containing amino acid cysteine was absent from all diet preparations, including Elemental Control and MR formulations. Following the partial oxidation step, it is preferred that no cysteine or cystine should be added back to the product.

Pasta has been prepared by cooking in the presence of hydrogen peroxide and glycerine. The result is pasta that has essentially no methionine but that can be easily rehydrated with hot water.

Cookies have been prepared by adding 5% hydrogen peroxide to the dough during the mixing process. The dough is then aged for two hours, sheeted and baked, resulting in cookies with very low levels of methionine. Bread can also be made with this process.

Other meal preparations such as jambalaya and rice and beans can be prepared by conducting conventional cooking in the presence of hydrogen peroxide.

Optionally, mogroside can be used to help mask some of the bitter tones that can result from oxidation or the unpleasant taste of any free amino acids that are added back as supplementation; for example as described in published international patent application WO 2011/046768, the complete disclosure of which is incorporated by reference.

The method of this invention may optionally be implemented either using hydrogen peroxide or ozone to lower methionine levels in food. Oxidation with ozone is generally preferred because even a trace of residual peroxide impairs the palatability of food products. Another reason for preferring ozone is that it is undesirable to oxidize lipids in a food product, and ozone does not oxidize lipids as rapidly as does hydrogen peroxide.

The method of this invention may optionally be implemented either on finished food products themselves, or in making protein-containing ingredients that in turn are used in recipes for making finished food products.

These foods can be incorporated into a low methionine diet that will be effective for improved quality of life of patients with obesity, insulin resistance, or other components of metabolic syndrome, including elevated plasma and hepatic lipid levels. Another potential application for these diets is in restricting tumor growth in cancer patients. Diets in accordance with the present invention may be helpful in slowing cancer growth, enhancing insulin sensitivity, and reducing cardiovascular disease risk.

There are generally no restrictions on the types of protein-containing human or animal foods or beverages that may be modified in accordance with the present invention; where "food" is understood to have the meaning set forth here. For purposes of the present specification and claims, the term "food" should be understood to have a particular meaning. The intention of this definition is to provide a convenient, shorthand notation for purposes that will be useful in the specification and claim. The definition is not intended to have any other implications. Unless otherwise expressly stated or otherwise clearly implied by context, as used in the specification and claims the term "food" should be understood to encompass only protein-containing foods, and protein-containing beverages, and protein-containing ingredients that are useful in preparing consumable items such as foods or beverages. A "food" may be intended for consumption either by humans or by animals. A substance that otherwise might ordinarily be considered to be a "food" or a "beverage" in normal usage, but that does not contain a nutritionally-significant amount of protein, is not treated as a "food" for purposes of the present invention.

Further, as used in the claims, a mixture of free amino acids is not considered to be a "protein," regardless of whether mixtures of free amino acids might sometimes be considered to be "protein" in other contexts. Further, as used in the claims, a composition that might otherwise be considered to be a food, but in which the mass ratio of free amino acids to total protein is greater than 25%, is not considered to be a "protein-containing food," and hence the composition is not considered to be a "food" for purposes of the claimed invention. Thus, for example, a product such as "Hominex™ Amino Acid-Modified Medical Food" is not considered to be a "food" for purposes of the present claims (notwithstanding that Hominex™ might be considered to be a "food" in other contexts), because it principally contains free amino acids, and contains essentially no "protein" that is in a form other than free amino acids.

Additionally, as used in the claims, a "naturally-occurring" protein is a protein that is produced in vivo by a living organism. In this context, a mutant protein, a fusion protein, a designed protein, or the like that is the result of artificial selection or genetic engineering is still considered "naturally-occurring" if it is produced in vivo by a living organism. By contrast, a "modified protein" is a protein that is derived from a naturally-occurring protein, but in which some or all of the methionine and cysteine residues have preferentially been oxidized artificially ex vivo. While it is possible that some fraction of other amino acid residues may also be oxidized or partially oxidized as well as a consequence, e.g. lysine and tryptophan, most of the other amino acid residues besides methionine and cysteine remain unoxidized. A modified protein retains most or all of the primary structure of the naturally-occurring protein. Cysteine-cysteine disulfide bonds will generally be broken in the modified protein as the cysteines are oxidized; some of the secondary structure may be altered in the modified protein as compared to that of the naturally-occurring protein; and some or all of the tertiary structure may be modified. As used in the claims, a "food protein" is a protein that is suitable for consumption by humans or animals, either "as is" or after cooking.

Ozone is a preferred oxidizing agent, and it is preferred that the food have a high surface area-to-volume ratio during the partial oxidation step, to promote penetration of the ozone into the food.

Non-limiting examples of food products for which the invention may be used include beverages containing milk components such as milk beverages, coffee containing milk components, cafe au lait, milk tea, fruit milk beverages, drinkable yogurt, lactic acid bacteria beverages or the like; dairy products; soy products, including soy "milk"; bakery products; desserts such as yogurt, puddings, Bavarian cream, blancmange, cakes, brownies, mousse and the like, sweetened food products eaten at tea time or following meals; frozen foods; cold confections, e.g. ice cream, ice milk, lacto-ice and the like; baked confections or steamed confections such as cakes, crackers, biscuits, buns with bean-jam filling and the like; rice cakes and snacks; crèmes including butter crèmes, flour pastes, whipped cream and the like; breads or other starch products; processed agricultural products, livestock products or seafood; processed meat products such as sausages, cracklins, and the like; snacks such as potato chips, cookies, or the like; cereal products; dietary supplements; animal feed; nutraceutical products, which includes any food or part of a food that may provide medicinal or health benefits, including the prevention and treatment of disease i.e., cardiovascular disease and high cholesterol, diabetes, osteoporosis, inflammation, or auto-immune disorders), non-limiting examples of nutraceuticals include naturally nutrient-rich or medicinally active foods that are beneficial to the treatment of specific diseases or conditions, such as diabetes, osteoporosis, inflammation, or high cholesterol levels in the blood.

"Palatability" is a subjective concept. As used in the specification and claims, "palatability" refers to the subjective acceptability of a food or food product by many or most of the patients (human or animal) for whom the food or food product is intended. At a minimum, a food is considered "palatable" if it is subjectively acceptable to patients (human or animal) for whom the food or food product is intended, at a substantially or significantly higher rate than is a product that has the same (or closely similar) amino acid profile, but in which the amino acids are supplied as free amino acids rather than incorporated into a protein.

TABLE 1

| | Abbreviations |
|---|---|
| AA | Amino acid |
| CAS-CON | Casein Control |
| ELE-CON | Elemental Control |
| ELE-MR, or MR-17 | Elemental Methionine-restricted at 0.17% diet (=1.2 grams methionine per 100 grams total protein) |
| MR | Methionine restriction, methionine-restricted |
| MR-25 | Elemental Methionine-restricted at 0.25% (=1.8 grams methionine per 100 grams total protein) |
| MR-34 | Elemental Methionine-restricted at 0.34% (=2.4 grams methionine per 100 grams total protein) |
| OX-CAS-CON | Oxidized Casein Control |
| OX-CAS-MR | Oxidized Casein Methionine-restricted |

EXAMPLE 1

Oxidizing Methionine in Food for Human or Animal Consumption

We have discovered a method to oxidize or partially oxidize the methionine in proteins, and then to use the partially oxidized proteins to make foods that, when supplemented with tryptophan, methionine, and (optionally) lysine as needed, are complete and palatable. These products are used in medical foods for advanced cancer patients and for patients attempting to restrict weight gain, improve insulin action, improve lipid profiles, or prolong life, or for other conditions. Additionally, the foods can be delivered in convenient format, similar to some currently-marketed weight loss food programs.

A low-methionine diet using conventional food products can be prepared when the ingredients or the proteins are oxidized to convert methionine to methionine sulfone. However, when methionine is oxidized, the essential amino acid tryptophan is also oxidized, and lysine can be oxidized to some extent. Thus, it is strongly preferred that the products should be supplemented with tryptophan and optionally with lysine, preferably in concentrations to restore their pre-oxidation levels. Additionally, a small amount of methionine is added to bring the final concentration of methionine to a range from about 0.85 to about 1.8 grams methionine per 100 grams of total protein, because a diet completely devoid of methionine would have undesirable health consequences.

As examples, we have shown that samples of beans, ground beef, milk, eggs, pasta, brown rice, flour, spaghetti sauce, gravy mix, chili seasoning and spaghetti seasoning can be treated with 10% (by volume) of a 30% (by volume) hydrogen peroxide solution, heated to 93° C., and then left to sit for 8 hours at 4° C. to oxidize the methionine content of the samples. Samples were then treated with peroxidase (5 mg/ 25 ml) and held at 4° C. for 12 hours to remove the peroxide from the samples to enhance palatability. (Residual peroxide lowers palatability.) The resulting food samples were analyzed for amino acid content, and found to have low methionine and low cysteine. As shown in Table 2, both the methionine and the cystine/cysteine content were decreased by the oxidation. The highest decrease was seen in eggs, milk and pasta. Table 2 lists methionine and cysteine results after oxidation, from an amino acid analysis conducted by Covance Inc. (Madison, Wis.).

TABLE 2

Methionine and cystine content of food samples

|  | Methionine (mg/100 g) | | Cystine (mg/100 g) | |
| --- | --- | --- | --- | --- |
|  | (initial) | (after oxidation) | (initial) | (after oxidation) |
| Egg | 3067 | 171 | 2206 | 38.8 |
| Ground Beef | 1143 | 715 | 522 | 360 |
| Pasta | 242 | <10 | 288 | <10 |
| Beans | 280 | 193 | 240 | 81.2 |
| Milk | 86 | <10 | 20 | <10 |

Nonfat dry milk powder was mixed with water at twice the recommended concentration according to the manufacturer's instructions, and treated with 10% $H_2O_2$ (i.e., 10% by mass, based on nonfat dry milk powder). The mixture was heated to 100° C. with continuous shaking, and then cooled overnight at 4° C. The mixture was then heated to 25-30° C. and reacted with 1000 units of catalase per gram of $H_2O_2$ for at least 30 minutes. This catalase step was repeated 3 more times for a total of 4000 units of catalase per gram of $H_2O_2$. The product was cooled to 4° C. and finally brought to the manufacturer's recommended volume with water.

Ten healthy adult males (8 Caucasian, 2 African American), ages 34±14.0 years old were presented with a sample of oxidized milk and a sample of Hominex®-2 and were asked to rate them on a 9-point scale for appearance, taste, and overall liking, where 1=dislike extremely, 5=neither like nor dislike, and 9=like extremely. Finally, the panelists were asked to decide which of the two samples they preferred. Oxidized milk scored consistently higher for all three attributes, with differences of 1.0 point for appearance and 1.9 points for flavor and overall liking as compared to Hominex®-2 (although the results were not statistically significant because the size of the panel was small). Additionally, 9 of the 10 subjects preferred oxidized milk to Hominex®-2. The oxidized milk was judged to be more palatable than the mixture of free amino acids. See Table 3 and FIG. 1.

TABLE 3

Results of the palatability test of low-methionine, oxidized milk (OM) compared to Hominex ®-2 (HX)

|  | Panelist | 1 | 2 | 3 | 4 | 5 | 6 | 7 | 8 | 9 | 10 | Average | SD |
| --- | --- | --- | --- | --- | --- | --- | --- | --- | --- | --- | --- | --- | --- |
| Hominex | Appearance | 5 | 4 | 5 | 5 | 2 | 2 | 8 | 3 | 7 | 3 | 4.4 | 2.01 |
|  | Flavor | 4 | 1 | 2 | 1 | 2 | 1 | 2 | 2 | 7 | 1 | 2.3 | 1.89 |
|  | Liking | 5 | 1 | 2 | 1 | 2 | 1 | 2 | 2 | 7 | 2 | 2.5 | 1.96 |
| Ox Milk | Appearance | 5 | 5 | 5 | 8 | 5 | 6 | 8 | 5 | 3 | 4 | 5.4 | 1.58 |
|  | Flavor | 4 | 4 | 4 | 3 | 5 | 3 | 7 | 5 | 4 | 3 | 4.2 | 1.23 |
|  | Liking | 4 | 5 | 4 | 3 | 5 | 3 | 7 | 5 | 5 | 3 | 4.4 | 1.26 |
| Preferred |  | OM | OM | OM | OM | OM | OM | OM | OM | HX | OM |  |  |
| Age |  | 58 | 27 | 32 | 27 | 27 | 24 | 62 | 28 | 28 | 25 | 33.8 | 14.0 |

EXAMPLE 2

Low Methionine Diet for Humans or Animals

A low-methionine diet can increase fat oxidation and lower hepatic lipids in humans. Previously-reported low-methionine diets have typically contained a relatively high content of cystine/cysteine (e.g., ~6 grams cysteine per 100 grams total protein), which we believe is undesirable because cysteine can partially offset the beneficial effects of low methionine. By contrast, providing highly palatable foods in accordance with the present invention, foods in which methionine and cystine/cysteine have been depleted, will enhance patient compliance, will help avoid the complicating effect of fat-free mass loss from insufficient caloric intake, and will help avoid the methionine-sparing effects produced by cystine/cysteine in the diet.

EXAMPLE 3

Preparation of Oxidized Milk, and its Palatability for Humans

To test the appearance, flavor and liking of oxidized food for humans, we compared oxidized milk to Hominex®-2 at the same protein equivalent percentage. The oxidized milk had low methionine and was prepared in accordance with the methods of the present invention.

Comments on the Hominex®-2 Sample:
Can taste addition of supplements, leaves aftertaste
Cannot drink
Oily taste is unpleasant
Tastes of cardboard
Brown and salty
Smells and tasted like bread
Comments on the Oxidized Milk Sample:
If this is amino acid modified, it is barely detectable
Bad aftertaste
Appearance not great and does not really taste of anything but it's fine
Unpleasant smell, aftertaste
Didn't have much of a smell, tasted like expired milk

EXAMPLE 4

Ozone Treatment for Methionine Oxidation

A preferred way to remove methionine is to treat food with ozone rather than with hydrogen peroxide. Ozone is FDA-approved for use as an antimicrobial agent for all types of foods. We found that MR foods treated with ozone tasted better than those treated with peroxide. Freeze-dried ice cream and bean powders that were treated with ozone and then reconstituted tasted fairly similar to the original products, and had no peroxide aftertaste. Similar results were obtained with skim milk that had been treated with ozone.

Dry foods were used as materials for treatment: Quaker™ corn meal, Back Packer's Pantry™ freeze dried pinto beans meal, and NASA freeze dried ice cream. The ozone generator, purchased from Del Ozone, was a portable purifier that produces 3 percent ozone.

Dried food products were treated with ozone to oxidize methionine to methionine sulfone. 200 g of sample were treated under a continuous airflow of 3% ozone until the materials tested positive for methionine sulfone. Amino acid analysis was performed to confirm methionine sulfone production, and to monitor the amino acid profile. Blank treatments were also performed for each of the three samples. Additionally, uncontrolled tastings of the oxidized food samples confirmed the palatability of the food samples in each case.

Preparation of Samples for Analysis:
1. 10 mg of sample was placed into a hydrolysis tube, into which was added 500 μL of 6N Hydrogen Chloride (HCl) containing 0.25% phenol.
2. The sample was frozen with liquid nitrogen. The hydrolysis tube was connected to vacuum for 1 minute. The tube was sealed before removing it from vacuum. Then the sample was thawed. This procedure was repeated three times.
3. The sealed tubes were placed in a heating block at 150° C. for 70 minutes.
4. The tubes were cooled to room temperature and then slowly opened. Then 25 μl of hydrolysates were transferred to microcentrifuge tubes and dried with a speed vac.
5. Then 50 μL of a 0.4 mM norleucine solution (internal standard) was added to the microcentrifuge tube, and the mixture was allowed to dry.
6. Next 20 μL of derivatization solution (ethanol:water:triethylamine:phenyl isocyanate, 7:1:1:1 by volume) was added to each sample microcentrifuge tube. The tubes were centrifuged, and left to stand for 30 min at room temperature.
7. The sample was desiccated with a freeze dryer overnight.
8. A reference standard (Amino acid standard+norleucine internal standard) and the sample were separately dissolved into 500 μL diluent (5 mM $Na_2HPO_4$ buffer, pH 7.4, containing 5% acetonitrile) and then filtered with a 0.2 um syringe filter.
9. High-performance liquid chromatography analysis was then conducted (injection: 10 μl).

The high-performance liquid chromatography used a Waters 616 pump, a Waters 207 Autosampler, and a 996 Photodiode Assay Detector. The samples were evaluated and controlled with Waters Empower 2 software. A C18 Waters Pico-Tag column was used for the analysis (4 μm, 3.9×150 mm). A Nova-Pak guard column (4 μm, 3.9×20 mm) maintained at a constant temperature of 38° C. produced a gradient of mixed eluents A and B. Eluent A was 140 mM sodium acetate, 0.05% triethylamine, with a pH 6.40. (To attain this pH, the mixture was titrated with glacial acetic acid; and then 60 ml/L acetonitrile in water was added.) Eluent B was 60% acetonitrile in water. Phenothiocarbamyl amino acids were detected as they eluted from the column by monitoring UV absorption at 254 nm. Eluent A was added and equilibrated to the column for 5 min. Analysis was conducted with 10 μl samples; and analyses of consecutive samples were separated by 25 min.

Of the samples tested (shown in Table 4), methionine was oxidized to methionine sulfone most poorly in the cornmeal. Methionine sulfone was produced after one, three, and six days of ozone treatment in the corn meal, ice cream, and beans, respectively.

TABLE 4

Treatment time required for oxidizing methionine with 3% ozone

| PRODUCT | TREAT-MENT TIME | METHIONINE IN PRODUCT (grams of amino acid per 100 grams total protein) | METHIONINE SULFONE IN PRODUCT (grams of amino acid per 100 grams total protein) |
|---|---|---|---|
| Beans | 6 days | 0.033 | 0.27 |
| Ice Cream | 3 days | 0.079 | 0.592 |
| Corn Meal | 1 day | 2.34 | 0.696 |

Tables 5-7 show the detailed amino acid profiles of the three foods: corn meal at day 1, beans at day 6, and ice cream at day 3. The row labelled "MSF" shows the methionine sulfone in the product, and "MET" shows the methionine in the product.

TABLE 5

Amino acid profile of treated corn meal at day 1.

| Amino acid | Retention time (min) | Peak Area 1 | Peak Area 2 | mean | Amount nmol | Amount ng | % in dry sample (w/w) | % In total AA (w/w) |
|---|---|---|---|---|---|---|---|---|
| Asp | 1.923 | 970080 | 973956 | 972018 | 2.568554 | 295.514 | 0.966 ± 0.003 | 5.596 |
| Glu | 2.156 | 2884697 | 2903389 | 2894043 | 7.947536 | 1026.18 | 3.354 ± 0.015 | 19.430 |
| Ser | 4.052 | 1210513 | 1218868 | 1214690 | 3.343462 | 291.148 | 0.951 ± 0.005 | 5.511 |
| Gly | 4.332 | 2218086 | 2222659 | 2220373 | 3.44685 | 196.642 | 0.643 ± 0.001 | 3.722 |
| His | 4.668 | 570258 | 570497 | 570378 | 0.879955 | 120.677 | 0.394 ± 0.0001 | 2.284 |
| Arg | 5.27 | 1522078 | 1522474 | 1522276 | 2.100813 | 328.126 | 1.072 ± 0.0002 | 6.211 |
| Thr | 5.631 | 1280868 | 1278184 | 1279526 | 1.73264 | 175.187 | 0.573 ± 0.001 | 3.316 |
| Ala | 5.918 | 4264343 | 4266414 | 4265379 | 4.929332 | 350.376 | 1.145 ± 0.0004 | 6.633 |
| Pro | 6.253 | 2927443 | 2990312 | 2958877 | 3.726995 | 361.965 | 1.183 ± 0.018 | 6.852 |
| MSF | 6.950 | 189132 | 163401 | 176266 | 0.225295 | 36.7681 | 0.120 ± 0.012 | 0.696 |
| Tyr | 9.677 | 1016309 | 1038977 | 1027643 | 1.719712 | 280.622 | 0.917 ± 0.014 | 5.312 |
| Val | 10.563 | 1738782 | 1750160 | 1744471 | 2.960398 | 293.286 | 0.958 ± 0.004 | 5.552 |
| Met | 11.198 | 573705 | 562846 | 568275 | 0.94239 | 123.632 | 0.404 ± 0.005 | 2.340 |
| Cys | 12.512 | 1062345 | 1121764 | 1092055 | 1.521062 | 338.132 | 1.105 ± 0.042 | 6.401 |

TABLE 5-continued

Amino acid profile of treated corn meal at day 1.

| Amino acid | Retention time (min) | Peak Area 1 | Peak Area 2 | mean | Amount nmol | Amount ng | % in dry sample (w/w) | % In total AA (w/w) |
|---|---|---|---|---|---|---|---|---|
| Ile | 12.722 | 3237180 | 3521460 | 3379320 | 5.483642 | 620.529 | 2.028 ± 0.121 | 11.750 |
| Leu | 12.890 | 669952 | 410896 | 540424 | 0.795847 | 90.0579 | 0.294 ± 0.010 | 1.705 |
| Phe | 14.278 | 1088807 | 1093936 | 1091371 | 1.643006 | 241.817 | 0.790 ± 0.003 | 4.578 |
| Lys | 15.945 | 897137 | 921262 | 909199 | 0.873045 | 111.828 | 0.365 ± 0.007 | 2.117 |
| Total | | | | | | 5282.6 | 17.26 | 100 |

TABLE 6

Amino acid profile of treated beans at day 6.

| Amino acid | Retention time | Amino Acid Amount (nmol) 1 | Amino Acid Amount (nmol) 2 | average | Amino Acid Amount (ng) | % in total AA (w/w) | % in dry sample |
|---|---|---|---|---|---|---|---|
| Asx | 1.946 | 0.826504 | 0.823459 | 0.824982 | 94.95538 | 10.84 | 1.187 |
| Glx | 2.202 | 1.265502 | 1.246163 | 1.255833 | 162.128 | 18.50 | 2.027 |
| Ser | 4.174 | 0.525953 | 0.503941 | 0.514947 | 44.85187 | 5.12 | 0.561 |
| Gly | 4.449 | 0.680472 | 0.679058 | 0.679765 | 38.81459 | 4.43 | 0.485 |
| His | 4.8 | 0.207846 | 0.210522 | 0.209184 | 28.70002 | 3.28 | 0.359 |
| Arg | 5.441 | 0.239063 | 0.236902 | 0.237982 | 37.17284 | 4.24 | 0.465 |
| Thr | 5.804 | 0.149148 | 0.148006 | 0.148577 | 15.02109 | 1.71 | 0.188 |
| Ala | 6.092 | 0.486711 | 0.475227 | 0.480969 | 34.19689 | 3.90 | 0.427 |
| Pro | 6.369 | 0.609822 | 0.609222 | 0.609522 | 59.18462 | 6.76 | 0.74 |
| MSF | 6.922 | 0.13246 | 0.132884 | 0.132672 | 21.63883 | 2.47 | 0.27 |
| Tyr | 10.085 | 0.058765 | 0.059014 | 0.05889 | 9.610768 | 1.10 | 0.12 |
| Val | 10.67 | 0.552368 | 0.548955 | 0.550662 | 54.57059 | 6.23 | 0.682 |
| Met | 11.373 | 0.020785 | 0.019394 | 0.02009 | 2.635795 | 0.30 | 0.033 |
| Cys | 12.153 | N/A | N/A | N/A | NA | 0 | NA |
| Ile | 12.567 | 0.408121 | 0.408832 | 0.408476 | 46.23952 | 5.28 | 0.578 |
| Leu | 12.787 | 0.705406 | 0.698838 | 0.702122 | 79.48018 | 9.07 | 0.994 |
| Phe | 14.338 | 0.724717 | 0.72425 | 0.724483 | 106.6439 | 12.17 | 1.333 |
| Lys | 15.96 | 0.31544 | 0.314303 | 0.314872 | 40.36653 | 4.61 | 0.505 |
| Total | | | | | | 100 | 11.02 |

TABLE 7

Amino acid profile of treated ice cream at day 3.

| Amino acid | Retention time (min) | Amino Acid Amount (nmol) 1 | Amino Acid Amount (nmol) 2 | Amino Acid Amount (nmol) 3 | average | Amino Acid Amount (ng) | % in total AA (w/w) | % in dry sample (w/w) |
|---|---|---|---|---|---|---|---|---|
| Asx | 1.852 | 0.386192 | 0.381525 | 0.37879 | 0.382169 | 43.98763 | 7.174 | 0.55 |
| Glx | 2.07 | 0.956715 | 0.952451 | 0.964479 | 0.957882 | 123.6625 | 20.17 | 1.546 |
| Ser | 3.916 | 0.411282 | 0.405409 | 0.409916 | 0.408869 | 35.61247 | 5.808 | 0.445 |
| Gly | 4.209 | 0.259627 | 0.260043 | 0.259294 | 0.259654 | 14.82627 | 2.418 | 0.185 |
| His | 4.546 | 0.108124 | 0.112511 | 0.109736 | 0.110124 | 15.10896 | 2.464 | 0.189 |
| Arg | 5.105 | 0.082458 | 0.085204 | 0.087661 | 0.085107 | 13.29377 | 2.168 | 0.166 |
| Thr | 5.48 | 0.245104 | 0.237845 | 0.23875 | 0.240566 | 24.32127 | 3.966 | 0.304 |
| Ala | 5.773 | 0.302783 | 0.309188 | 0.300017 | 0.303996 | 21.61413 | 3.525 | 0.27 |
| Pro | 6.147 | 0.707136 | 0.691991 | 0.700404 | 0.699844 | 67.95482 | 11.08 | 0.849 |
| MSF | 6.658 | 0.278694 | 0.298758 | 0.294016 | 0.290489 | 47.37877 | 7.727 | 0.592 |
| Tyr | 9.544 | 0.042376 | 0.042678 | 0.042363 | 0.042473 | 6.931517 | 1.13 | 0.087 |
| Val | 10.464 | 0.346989 | 0.336618 | 0.33602 | 0.339876 | 33.68167 | 5.493 | 0.421 |
| Met | 11.188 | 0.055267 | 0.044435 | 0.045123 | 0.048275 | 6.333664 | 1.033 | 0.079 |
| Cys | N/A | N/A | N/A | N/A | N/A | N/A | N/A | N/A |
| Ile | 12.459 | 0.200288 | 0.198588 | 0.204801 | 0.201226 | 22.77875 | 3..715 | 0.285 |

TABLE 7-continued

Amino acid profile of treated ice cream at day 3.

| Amino acid | Retention time (min) | Amino Acid Amount (nmol) | | | | Amino Acid Amount (ng) | % in total AA (w/w) | % in dry sample (w/w) |
|---|---|---|---|---|---|---|---|---|
| | | 1 | 2 | 3 | average | | | |
| Leu | 12.676 | 0.562376 | 0.561211 | 0.560081 | 0.561223 | 63.53039 | 10.36 | 0.794 |
| Phe | 14.194 | 0.224062 | 0.227638 | 0.259901 | 0.237201 | 34.91593 | 5.694 | 0.436 |
| Lys | 15.931 | 0.229295 | 0.393871 | 0.248699 | 0.290621 | 37.25767 | 6.076 | 0.466 |
| Total | | | | | | | | 7.665 |

The data indicate that dense materials like corn meal are more difficult to oxidize with ozone. Ozone does not penetrate deeply into non-porous foods. It is preferred that the materials being ozonated should have a high surface area-to-volume ratio; and it is especially preferred that they should be highly porous. It is preferred that ozonation be carried out at higher levels of moisture and at higher pressures. In these examples the freeze-dried beans and ice cream were more porous and worked relatively well. The corn meal was relatively dense, and did not oxidize as well with ozone.

These initial tests used low ozone concentrations and operated at atmospheric pressure. The kinetic theory of gases implies that as we increase the temperature and pressure, more ozone will penetrate the materials, and reactions will be faster, giving better results. Once sufficient ozone is in contact with protein for a sufficient time, the methionine will oxidize. Given the teachings of the present disclosure, a person of ordinary skill in the art will readily be able to optimize reaction conditions for any particular food to be oxidized. Although details will vary from one food to the next, general suggested ranges for the oxidation process are: moisture, about 1% to about 10%; temperature, about 20° C. to about 70° C.; pressure, about 1 atm to about 10 atm; ozone concentration, about 1% to about 10%.

Additionally, it appears that water activity assists oxidation by ozone. Ozone reacts with water to form free radicals (superoxide radical, hydroperoxide radical, and hydroxyl radical), which in turn oxidize methionine. The concentration of free radicals increases with increasing pressure and increasing moisture. It is preferred that the water activity aw should be about 0.95 or greater. The effective ozone concentration in solution should be at least about 1%, preferably about 3%. A high pressure system is preferred for attaining higher ozone concentrations, e.g., about 3%. Oxidation by ozone occurs more slowly in the gas phase, particularly when the air is dry. As the relative humidity/moisture level increases, oxidation rates increase rapidly.

Ozone preferentially oxidizes methionine, tryptophan, and cysteine, but it will ultimately oxidize other amino acids as well if left in contact with the substrate too long. It is preferred to allow the oxidation to continue long enough to oxidize methionine to acceptably low levels, as set forth in this disclosure, before substantial oxidation of other amino acids has occurred. The simultaneous oxidation of tryptophan, cysteine, and to some extent lysine will also occur when methionine is oxidized.

Different proteins may respond differently to the partial oxidation protocol, in the extent to which other amino acids tend to be oxidized. For each type of protein or food, an otherwise-routine amino acid analysis of the oxidized product may be used to determine the extent of any needed amino acid supplementation(s).

EXAMPLE 5

Preparation of Oxidized Casein

The goals of this series of experiments were (1) to formulate an MR diet from a protein source in which methionine had been depleted by oxidation, and (2) to evaluate the ability of this experimental diet to reproduce the metabolic effects produced by an MR diet formulated from individual amino acids.

One gallon (3.79 L) of skim milk was acidified to pH 3.5 to precipitate casein. Following precipitation the milk was centrifuged at 5000 rpm for 1 min, and the top liquid whey layer was discarded. The bottom casein precipitate was reconstituted in a volumetric cylinder with water to 0.25 gallon (0.95 L). The casein and water mixture was transferred to a beaker, and the pH was adjusted to 2.5. Then 10% hydrogen peroxide by volume (95 ml) was added to the beaker, and the beaker was heated to 90° C. for one hour. The mixture was then allowed to cool for thirty minutes.

To remove the objectionable "peroxide flavor" the mix was centrifuged, and the top liquid layer was discarded. One liter of water was added, mixed with the casein precipitate, and the new mixture was centrifuged again. This procedure was repeated five times, discarding and replacing the liquid with new clean water each time to remove peroxide. Once the peroxide flavor had been removed the casein precipitate was collected and freeze-dried for amino acid analysis and subsequent use in formulating diets for the preclinical studies. The oxidized casein was also used for blind taste tests in humans, described in the next example.

EXAMPLE 6

Acceptability Test for Oxidized Casein

A sensory evaluation study was conducted to estimate the acceptability of hydrogen peroxide-oxidized casein drink and of oxidized casein with added amino acids (methionine, tryptophan and lysine). The samples were prepared to have a final concentration of 10% protein in water. Formulations are shown in Table 8.

TABLE 8

Protein drink formulations.

| | Oxidized Casein with added amino acids (g) | Oxidized Casein without added amino acids (g) |
|---|---|---|
| Casein | 153 | 153 |
| Lysine | 11.1 | — |
| Methionine | 1.4 | — |

TABLE 8-continued

Protein drink formulations.

| | Oxidized Casein with added amino acids (g) | Oxidized Casein without added amino acids (g) |
|---|---|---|
| Tryptophan | 1.6 | — |
| Hominex * | — | — |
| Water | 1424.50 | 1424.50 |
| TOTAL | 1591.60 | 1577.50 |

Samples were labeled with random numbers and served cold to ten panelists. The panelists were asked to rank flavor acceptability on a scale from 1 to 5, where 1 showed least acceptance and 5 greatest acceptance as shown in Table 9.

TABLE 9

Food acceptability scoring criteria.

| | |
|---|---|
| 1 | Dislike very much |
| 2 | Dislike |
| 3 | Neither like no dislike |
| 4 | Like |
| 5 | Like very much |

The panelists showed more acceptance for the drink made from oxidized casein with added methionine, tryptophan and lysine than for the drink made from oxidized casein alone. Table 10 shows the rankings that the panelists gave the samples.

TABLE 10

Panelists ranking of samples.

| Panelist | Sample | Score |
|---|---|---|
| 1 | Oxidized Casein With Amino Acids | 1 |
| 1 | Oxidized Casein | 2 |
| 2 | Oxidized Casein With Amino Acids | 4 |
| 2 | Oxidized Casein | 3 |
| 3 | Oxidized Casein With Amino Acids | 3 |
| 3 | Oxidized Casein | 2 |
| 4 | Oxidized Casein With Amino Acids | 2 |
| 4 | Oxidized Casein | 2 |
| 5 | Oxidized Casein With Amino Acids | 4 |
| 5 | Oxidized Casein | 1 |
| 6 | Oxidized Casein With Amino Acids | 3 |
| 6 | Oxidized Casein | 1 |
| 7 | Oxidized Casein With Amino Acids | 3 |
| 7 | Oxidized Casein | 2 |

TABLE 10-continued

Panelists ranking of samples.

| Panelist | Sample | Score |
|---|---|---|
| 8 | Oxidized Casein With Amino Acids | 4 |
| 8 | Oxidized Casein | 1 |
| 9 | Oxidized Casein With Amino Acids | 2 |
| 9 | Oxidized Casein | 1 |
| 10 | Oxidized Casein With Amino Acids | 2 |
| 10 | Oxidized Casein | 1 |

TABLE 11

Statistical analysis of oxidized casein acceptance.

| Contrast | Difference | Standardized difference | Critical value | P > Diff | Significant |
|---|---|---|---|---|---|
| With Amino Acids Without Amino Acids | 1.200 | 3.043 | 2.101 | 0.007 | Yes |
| Tukey's d critical value: | | | 2.971 | | |

TABLE 12

Mean acceptance groups.

| Category | Mean | Groups | |
|---|---|---|---|
| With Amino Acids | 2.800 | A | |
| Without Amino Acids | 1.600 | | B |

Oxidized casein had a mean score of 1.6, and oxidized casein with added amino acids had a mean score of 2.8, $p<0.007$. Panelists disliked oxidized casein, and neither liked nor disliked oxidized casein with added amino acids. The sensory test showed panelists' higher acceptance for oxidized casein with added amino acids over oxidized casein alone. Statistical results are shown in Tables 11 and 12.

EXAMPLE 7

Other Oxidized Protein Diets

After we demonstrated that the casein-based MR diet is effective, we conducted additional studies using diets formulated from other protein sources, as listed in Table 13. Clinical trials of MR diets in accordance with the present invention will be conducted in humans, including human cancer patients, in accordance with applicable laws and regulations.

TABLE 13

Treated Foods

| | | g/100 g Protein | | | | | g/100 g Food | | | |
|---|---|---|---|---|---|---|---|---|---|---|
| Test Material | Treatment Conditions | Methionine Untreated | Methionine Treated | Cysteine Untreated | Cysteine Treated | % Protein in Food | Methionine Untreated | Methionine Treated | Cysteine Untreated | Cysteine Treated |
| Casein from skim milk | 10% peroxide 2 h pH 2.5 | 1.65 | 0.20 | 0.35 | n/a | 92 | 1.52 | 0.19 | 0.33 | n/a |
| Egg whites | 10% peroxide 1 h | 4.35 | 0.35 | 3.14 | 1.59 | 64 | 2.79 | 0.23 | 2.01 | 1.02 |
| Omelet with cheese | 12% ozone 2 days Dry treatment | 3.98 | 3.54 | 0.32 | n/a | 70 | 2.79 | 2.48 | 0.23 | n/a |
| Beans | 3% ozone 7 days Dry treatment | 12.09 | 0.27 | 2.18 | n/a | 11 | 1.33 | 0.03 | 0.24 | n/a |

TABLE 13-continued

| | | Treated Foods | | | | | | | | |
|---|---|---|---|---|---|---|---|---|---|---|
| | | g/100 g Protein | | | | | g/100 g Food | | | |
| Test Material | Treatment Conditions | Methionine Untreated | Methionine Treated | Cysteine Untreated | Cysteine Treated | % Protein in Food | Methionine Untreated | Methionine Treated | Cysteine Untreated | Cysteine Treated |
| Ice Cream | 3% ozone 3 days Dry treatment | 3.14 | 1.00 | 1.28 | n/a | 7 | 0.22 | 0.07 | 0.09 | n/a |
| Beef stew | 12% ozone 3 days Dry treatment | 2.88 | 0.93 | 1.06 | n/a | 44 | 1.27 | 0.41 | 0.47 | n/a |
| Beef stew | 12% ozone 3 days Wet treatment | 2.88 | 1.88 | 1.06 | n/a | 46 | 1.27 | 0.83 | 0.47 | n/a |
| Rice 1 minute microwaved | 12% ozone 2 days | 4.00 | 2.40 | 3.20 | n/a | 10 | 0.40 | 0.24 | 0.32 | n/a |
| Ham | 12% ozone 2 days Dry treatment | 1.02 | 2.46 | 0.51 | n/a | 94 | 0.96 | 2.32 | 0.48 | n/a |
| Ham | 28% peroxide 18 h | 1.02 | n/a | 0.51 | n/a | 94 | 0.96 | n/a | 0.48 | n/a |
| Noodle Maruchan | 12% ozone 2 days Dry treatment | 1.50 | 1.20 | 1.60 | n/a | 20 | 0.30 | 0.24 | 0.32 | n/a |
| Potatoes | 12% ozone 2 days Dry treatment | 1.63 | 1.18 | 1.09 | n/a | 11 | 0.18 | 0.13 | 0.12 | n/a |
| Chicken breast | 10% peroxide 1 h | 4.47 | 2.62 | 1.61 | n/a | 94 | 4.21 | 2.47 | 1.52 | n/a |
| Mushroom Canned | 10% peroxide 1 h | 0.67 | 0.24 | 0.18 | n/a | 37 | 0.25 | 0.09 | 0.07 | n/a |
| Corn meal | 3% ozone 1.5 h | 1.52 | 2.35 | 1.24 | 6.47 | 17 | 0.26 | 0.40 | 0.21 | 1.10 |

EXAMPLE 8

Rat and Mouse Experiments

We have formulated a rodent diet, using methionine-depleted casein produced by our novel oxidation method. We have compared rodent metabolic response to this experimental diet with the response to a methionine-depleted diet formulated from individual amino acids. We found that the metabolic responses to both diets were similar. The modified, methionine-depleted casein will next be used to formulate dietary components for use in a human clinical pilot study.

Both the control and MR diet formulations were formulated with no added cystine/cysteine. Because cystine/cysteine spares the conversion of methionine to cysteine by trans-sulfuration in the methionine cycle of mammals, the primary effect of the diet is believed to accrue from lower combined levels of dietary methionine and cysteine. A recent study in rats showed that supplementing an MR diet with cystine/cysteine eliminated most of the metabolic benefits of the MR diet. The findings from that study suggested that various proteins chosen for methionine depletion should be assessed for potential interference from cystine/cysteine in the proteins. An MR diet should also be cysteine-restricted. The novel oxidation method removes both methionine and cysteine from proteins.

We measured the time course of behavioral and metabolic responses to an Elemental MR diet in male C57BL/6J mice beginning at 5-6 weeks of age. Twelve hours after initiating the MR diet, water intake increased. Seven days after initiating the diet, food intake and energy expenditure increased. Four weeks after the diet began, body weight, adiposity, and insulin all decreased. At eight weeks, insulin sensitivity, food intake, and energy expenditure all increased greatly, while adiposity decreased greatly.

The responses measured at the end of the study are summarized in Table 14. Note that these responses were fully developed after 8-10 weeks of dietary MR.

TABLE 14

Behavioral & Metabolic Responses to MR

| Response Variable | Control Diet | Dietary MR |
|---|---|---|
| Final Body Weight (g) | 36.3 ± 0.93 | 28.3 ± 0.75 |
| Final Adiposity (Fat/BW) × 100 | 32.3 ± 1.14 | 18.8 ± 1.45 |
| Food Consumption (g/mouse/d) | 3.54 ± 0.07 | 4.38 ± 0.08 |
| Energy Expenditure (kJ/d/kg LBM) | 73.4 ± 0.62 | 116.3 ± 1.32 |
| Plasma Insulin (ng/ml) | 2.26 ± 0.35 | 0.47 ± 0.10 |
| Plasma Adiponectin | 11.0 ± 0.40 | 22.7 ± 1.50 |
| Plasma Leptin (ng/ml) | 25.7 ± 6.10 | 6.1 ± 1.50 |
| Liver TG (mmol/g) | 0.45 ± 0.06 | 0.24 ± 0.04 |
| Serum TG (mmol/l) | 0.14 ± 0.02 | 0.10 ± 0.01 |

EXAMPLE 9

Preparation of Five Experimental Diets for Mice

Five diets were prepared under our direction by Dyets, Inc. (Bethlehem, Pa.). One of the diets was a conventional Elemental Control diet (ELE-CON), and one was the Elemental Methionine-restricted diet (ELE-MR), both of which were formulated from mixtures of individual amino acids as shown in Table 15. A third diet was formulated using un-oxidized casein (Casein Control diet, CAS-CON). The last two diets were formulated using oxidized, methionine-depleted casein prepared as described above. The Oxidized Casein Control diet (OX-CAS-CON) was formulated by adding back the individual amino acids (e.g., methionine, tryptophan, lysine) to match their original levels in the un-oxidized casein. The Oxidized Casein Methionine-restricted diet (OX-CAS-MR) was prepared by adding back tryptophan and lysine to their original levels, while adding methionine to produce a final concentration of 1.2 grams methionine per 100 grams total protein.

Before the diets were prepared, an amino acid analysis was conducted by Covance Inc. (Madison, Wis.) on the un-oxidized and oxidized lots of casein to verify the selectivity and completeness of the methionine depletion, as well as the before and after levels of cystine/cysteine, tryptophan, and lysine. The results of the analysis by Covance, Inc. are summarized in Table 16. The analysis showed that the oxidation method removed essentially all methionine, cysteine, and tryptophan from the casein, and ~50% of the lysine. The potential question of whether some level of dietary cystine/cysteine could counteract the metabolic effects of dietary MR should not arise, because the oxidation method effectively depleted cystine/cysteine as well as methionine.

Tables 17-19 show the final amino acid compositions of the several diets.

Table 20 shows a full listing of the components used to formulate all three diets. Elemental lysine, methionine and tryptophan were added to the CAS-CON and OX-CAS-CON diets to match the levels of these amino acids in the ELE-CON diet. For the OX-CAS-MR diet, lysine and tryptophan were added back to the original levels in the ELE-CON, and methionine was added back to a lower final concentration of 1.2 grams methionine per 100 grams total protein. Note that the three casein-based diets were all formulated to produce a final protein content of 14%. However, the difference in the final moisture content of the control casein and oxidized casein (Table 16) necessitated the addition of slightly different amounts of the respective caseins.

TABLE 15

Compositions of elemental control and MR diets.[1]

| Added Component (grams) | Elemental Control Diet | Elemental MR Diet |
|---|---|---|
| L-Arginine | 11.2 | 11.2 |
| L-Lysine HCl | 18.0 | 18.0 |
| L-Histidine | 3.3 | 3.3 |
| L-Isoleucine | 8.2 | 8.2 |
| L-Valine | 8.2 | 8.2 |
| DL-Methionine | 8.6 | 1.7 |
| L-Threonine | 8.2 | 8.2 |
| L-Tryptophan | 1.8 | 1.8 |
| L-Phenylalanine | 11.6 | 11.6 |
| Glycine | 23.3 | 23.3 |
| L-Leucine | 11.1 | 11.1 |
| L-Glutamic Acid | 27.1 | 33.9 |
| Total Amino Acids | 140.5 | 140.5 |
| Dextrose | 200 | 200 |
| Dyetrose | 50 | 50 |
| Cornstarch | 432.5 | 432.5 |
| Corn Oil | 80 | 80 |
| Cellulose | 50 | 50 |
| Mineral Mix #200000 | 35 | 35 |
| Vitamin Mix #300050 | 10 | 10 |
| Choline Bitartrate | 2 | 2 |
| Total | 1000 | 1000 |

[1]The Elemental Control and Methionine-restricted (MR) diets were formulated by Dyets, Inc. to produce final concentrations of methionine in the diet of 8.6 g/kg (6.1 grams methionine per 100 grams total protein), and 1.7 g methionine/kg diet (1.2 grams methionine per 100 grams total protein), respectively.

TABLE 16

Amino acid and macronutrient composition of the casein used to formulate the CAS-CON diet, the OX-CAS-CON diet, and the OX-CON-MR diet.[1]

| Protein Source | Control Casein (grams/100 g) | Oxidized Casein (grams/100 g) |
|---|---|---|
| Alanine | 2.7 | 2.6 |
| Arginine | 2.8 | 5.5 |
| Asparagine | NA | NA |
| Aspartate | 6.0 | 6.0 |
| Cysteine | 0.4 | .02 |
| Glutamate | 19.5 | 17.4 |
| Glycine | 1.6 | 1.6 |
| Histidine | 2.4 | 1.5 |
| Isoleucine | 4.9 | 3.8 |
| Leucine | 8.4 | 8.2 |
| Lysine | 7.5 | 4.5 |
| Methionine | 2.8 | 0.2 |
| Phenylalanine | 4.5 | 4.4 |
| Proline | 10.4 | 9.0 |
| Serine | 5.0 | 4.1 |
| Threonine | 4.0 | 3.1 |
| Tryptophan | 1.3 | 0.1 |
| Tyrosine | 5.1 | 5.1 |
| Valine | 5.5 | 5.2 |
| Protein (g/100 g) | 88.8 | 80.1 |
| CHO (g/100 g) | 1.4 | 6.3 |
| Fat (g/100 g) | 1.4 | 1.2 |
| Ash (g'/100 g) | 1.9 | 1.5 |
| Moisture (g/100 g) | 6.5 | 10.9 |
| Total % | 100.0 | 100.0 |

[1]Composition of the control and oxidized casein were determined by Covance, Inc. (Princeton, NJ). Lysine, methionine, and tryptophan were supplemented in the Casein Control, Oxidized Casein Control and Oxidized Casein Methionine-restricted diets.

TABLE 17

Final amino acid composition of CAS-CON diet.[1]

| | Control Casein (grams/141 g) | Added Amino Acids (grams) | Final Amino Acid (grams) |
|---|---|---|---|
| Alanine | 3.8 | 0 | 3.8 |
| Arginine | 3.9 | 0 | 3.9 |
| Asparagine | 0 | 0 | 0 |
| Aspartate | 8.5 | 0 | 8.5 |
| Cysteine | 0.6 | 0 | 0 |
| Glutamate | 27.5 | 0 | 27.5 |
| Glycine | 2.3 | 0 | 2.3 |
| Histidine | 3.4 | 0 | 3.4 |
| Isoleucine | 6.9 | 0 | 6.9 |
| Leucine | 11.8 | 0 | 11.8 |
| Lysine | 10.6 | 7.4 | 18.0 |
| Methionine | 3.9 | 4.7 | 8.6 |
| Phenylalanine | 6.3 | 0 | 6.3 |
| Proline | 14.7 | 0 | 14.7 |
| Serine | 7.1 | 0 | 7.1 |
| Threonine | 5.6 | 0 | 5.6 |
| Tryptophan | 1.8 | 0 | 1.8 |
| Tyrosine | 7.2 | 0 | 7.2 |
| Valine | 7.8 | 0 | 7.8 |

[1]The Casein Control diet was formulated by Dyets, Inc. using 141 g of the control casein to provide a protein concentration in the diet of 14%. Lysine and methionine were added to the diet formulation to match the lysine and methionine concentrations provided in the Elemental Control diet. The final concentration of methionine was 6.1 grams per 100 grams total protein.

TABLE 18

Final amino acid composition of OX-CAS-CON diet.[1]

| | Oxidized Casein (grams/153 g) | Added Amino Acids (grams) | Final Amino Acid (grams) |
|---|---|---|---|
| Alanine | 4.0 | 0 | 4.0 |
| Arginine | 8.4 | 0 | 8.4 |
| Asparagine | 0 | 0 | 0 |
| Aspartate | 9.2 | 0 | 9.2 |
| Cysteine | 0 | 0 | 0 |
| Glutamate | 26.6 | 0 | 26.6 |
| Glycine | 2.4 | 0 | 2.4 |
| Histidine | 2.3 | 0 | 2.3 |
| Isoleucine | 5.8 | 0 | 5.8 |
| Leucine | 12.5 | 0 | 12.5 |
| Lysine | 6.9 | 11.1 | 18.0 |
| Methionine | 0.3 | 8.3 | 8.6 |
| Phenylalanine | 6.7 | 0 | 6.7 |
| Proline | 13.8 | 0 | 13.8 |
| Serine | 6.3 | 0 | 6.3 |
| Threonine | 4.7 | 0 | 4.7 |
| Tryptophan | 0.2 | 1.6 | 1.8 |
| Tyrosine | 7.8 | 0 | 7.8 |
| Valine | 8.0 | 0 | 8.0 |

[1]The Oxidized Casein Control diet was formulated by Dyets, Inc. using 153 g of the oxidized casein to provide a final protein concentration in the diet of 14%. To make up for the difference in moisture content of the control casein and oxidized casein (see Table 2A), the Oxidized Casein Control diet was formulated using 153 g of the oxidized casein to match the amino acid content of the Control Casein diet. Lysine, methionine, and tryptophan were added to the diet formulation to restore their concentrations to the same as those in the Elemental Control diet. The final concentration of methionine was 6.1 grams per 100 grams total protein.

TABLE 19

Final amino acid composition of OX-CAS-MR diet.[1]

| | Oxidized Casein (grams/153 g) | Added Amino Acids (grams) | Final Amino Acid (grams) |
|---|---|---|---|
| Alanine | 4.0 | 0 | 4.0 |
| Arginine | 8.4 | 0 | 8.4 |
| Asparagine | 0 | 0 | 0 |
| Aspartate | 9.2 | 0 | 9.2 |
| Cysteine | 0 | 0 | 0 |
| Glutamate | 26.6 | 0 | 26.6 |
| Glycine | 2.4 | 0 | 2.4 |
| Histidine | 2.3 | 0 | 2.3 |
| Isoleucine | 5.8 | 0 | 5.8 |
| Leucine | 12.5 | 0 | 12.5 |
| Lysine | 6.9 | 11.1 | 18.0 |
| Methionine | 0.3 | 1.4 | 1.7 |
| Phenylalanine | 6.7 | | 6.7 |
| Proline | 13.8 | 0 | 13.8 |
| Serine | 6.3 | 0 | 6.3 |
| Threonine | 4.7 | 0 | 4.7 |
| Tryptophan | 0.2 | 1.6 | 1.8 |
| Tyrosine | 7.8 | 0 | 7.8 |
| Valine | 8.0 | 0 | 8.0 |

[1]The Oxidized Casein Methionine-restricted diet was formulated by Dyets, Inc. using 153 g of the oxidized casein to provide a final protein concentration in the diet of 14%. To make up for the difference in moisture content of the control casein and oxidized casein, 153 g of the oxidized casein was used to match the amino acid content of the Control Casein diet. Lysine, methionine, and tryptophan were added to the diet formulation to restore their concentrations to the same as those of the Elemental Methionine-restricted diet. The final concentration of methionine was 1.2 grams per 100 grams total protein.

TABLE 20

Components of CAS-CON, OX-CAS-CON, and OX-CAS-MR diets.[1]

| Added Component (g/kg diet) | Casein Control Diet | Oxidized Casein Control Diet | Oxidized Casein MR Diet |
|---|---|---|---|
| Control Casein | 141 | 0 | 0 |
| Oxidized Casein | 0 | 153 | 153 |
| DL-Methionine | 4.7 | 8.3 | 1.4 |
| L-Lysine | 7.4 | 11.1 | 11.1 |
| Tryptophan | 0 | 1.6 | 1.6 |
| Dextrose | 200 | 200 | 200 |
| Dyetrose | 50 | 50 | 50 |
| Cornstarch | 419.9 | 399 | 405.9 |
| Corn Oil | 80 | 80 | 80 |
| Cellulose | 50 | 50 | 50 |
| Mineral Mix #200000 | 35 | 35 | 35 |
| Vitamin Mix #300050 | 10 | 10 | 10 |
| Choline Bitartrate | 2 | 2 | 2 |
| Total (g) | 1000 | 1000 | 1000 |

[1]The Casein Control diet was formulated with casein that had not been subjected to oxidation. The Oxidized Casein Control diet and Oxidized Casein Methionine-restricted diets were formulated with casein that had been subjected to mild oxidation as described above. The final concentration of methionine in the Casein Control and Oxidized Casein Control diets was 6.1 grams per 100 grams total protein; and the concentration in the Oxidized Casein Methionine-restricted diet was 1.2 grams methionine per 100 grams total protein.

EXAMPLE 10

Experiments with Casein Diets in Mice

Forty, five-week old male C57BL/6J mice were obtained from Jackson Labs and divided into one group of 16 (Group 1) and one group of 24 (Group 2) upon arrival. During the 10-day quarantine and adaptation period after arrival, all mice in Group 1 received the ELE-CON diet, and all mice in Group 2 received the CAS-CON diet. After the quarantine/adaptation period, half the mice in Group 1 continued to receive the ELE-CON diet while the remaining 8 mice in Group 1 were switched to the ELE-MR diet. 8 mice in Group 2 continued to receive the CAS-CON diet, 8 mice in Group 2 were given the OX-CAS-CON diet, and 8 mice in Group 2 were given the OX-CAS-MR diet.

Over the subsequent 8 weeks, behavioral, metabolic, and endocrine responses to the respective diets were compared. The two elemental diets served as positive and negative controls for the casein-based diets, while the OX-CAS-CON diet served as a positive control to confirm that any effects of oxidation, aside from removing methionine and cystine, did not affect the metabolic responses of mice to the diet.

The mice in each group received the assigned diet for 9 weeks after weaning prior to evaluating energy expenditure by indirect calorimetry, followed by sacrifice to harvest blood and tissues for evaluation of transcriptional responses. The behavioral and metabolic responses of the five groups are summarized in FIGS. 2-5 and Tables 21 and 22.

TABLE 21

Evaluation of growth, body composition, energy intake, energy expenditure (EE), activity, and respiratory exchange rate (RER) in C578L/6J mice after dietary MR using oxidized casein to selectively destroy methionine.[1,2]

| Response | Elemental Control | Elemental MR | Casein Control | Oxidized Casein Control | Oxidized Casein MR |
|---|---|---|---|---|---|
| Body Weight (g) | $27.6 \pm 0.6^a$ | $21.9 \pm 0.6^b$ | $28.0 \pm 1.3^a$ | $24.7 \pm 0.4^c$ | $21.3 \pm 0.3^b$ |
| Fat Mass (g) | $5.5 \pm 0.4^a$ | $3.3 \pm 0.2^b$ | $5.9 \pm 0.9^a$ | $3.3 \pm 0.2^b$ | $2.8 \pm 0.1^b$ |
| Adiposity (g fat/g BW * 100) | $19.9 \pm 1.1^a$ | $15.3 \pm 1.0^b$ | $20.3 \pm 2.3^a$ | $13.4 \pm 0.8^b$ | $13.2 \pm 0.4^b$ |
| Energy Intake (kJ/mouse/day) | $43.1 \pm 1.4^a$ | $52.5 \pm 1.9^b$ | $39.3 \pm 2.0^a$ | $44.4 \pm 1.4^a$ | $44.1 \pm 1.5^a$ |
| Energy Intake (kJ/g BW/day) | $1.53 \pm 0.05^a$ | $2.39 \pm 0.06^b$ | $1.42 \pm 0.06^a$ | $1.80 \pm 0.06^c$ | $2.07 \pm 0.04^d$ |
| ANCOVA EE (kJ/mouse/day)[2] | $34.4 \pm 0.3^a$ | $48.5 \pm 0.3^b$ | $35.8 \pm 0.3a$ | $38.1 \pm 0.3^a$ | $48.3 + 0.4^b$ |
| Total Activity | $734 \pm 50^a$ | $682 \pm 54^a$ | $598.0 \pm 43^a$ | $630 \pm 50^a$ | $676 \pm 46^a$ |
| RER | $0.91 \pm 0.01^a$ | $0.94 \pm 0.01^a$ | $0.92 \pm 0.01^a$ | $0.91 \pm 0.01^a$ | $0.94 \pm 0.01^a$ |

[1]Using diets formulated by Dyets, Inc. as described above, eight mice of each genotype were fed the respective diets ad libitum for 9 weeks after weaning, after which all mice were adapted to indirect calorimetry chambers for 48 hours. Thereafter, oxygen consumption ($VO_2$), $CO_2$ production, and total activity were measured every 15 minutes for 72 hours. Energy expenditure and RER were calculated from $VO_2$ and $VCO_2$ by standard methods. Body weight, fat mass, adiposity, energy intake, total activity and RER were compared by analysis of variance. Post hoc testing of means was calculated using the Bonferroni correction. Means within each row bearing a different superscript were significantly different at $P < 0.05$.
[2]The repeated measures of EE per mouse were evaluated by Analysis of Covariance using lean mass, fat mass, and activity as covariates to calculate least square means to test for dietary differences. Means within each row bearing a different superscript were significantly different at $P < 0.05$.

TABLE 22

Effects of dietary MR using elemental diets or diets constructed from oxidized casein on serum biomarkers, serum lipids, and genes associated with lipid synthesis in liver and fatty acid oxidation in white adipose tissue.[1]

| Response | Elemental Control | Elemental MR Diet | Casein Control Diet | Oxidized Casein | Oxidized Casein |
|---|---|---|---|---|---|
| Serum insulin (ng/ml) | $0.93 \pm 0.12^a$ | $0.43 \pm 0.05^b$ | $0.90 \pm 0.20^a$ | $0.57 \pm 0.08^b$ | $0.35 \pm 0.02^{bc}$ |
| Serum FGF-21 (μg/ml) | $2255 \pm 613^a$ | $8242 \pm 1051^b$ | $1466 \pm 290^a$ | $2273 \pm 409^a$ | $4966 \pm 497^b$ |
| Serum Triglyceride | $103 \pm 9^a$ | $64 \pm 3^h$ | $94 \pm 6^a$ | $42 \pm 2^c$ | $40 \pm 1^c$ |
| Liver Triglyceride | $73 \pm 9^a$ | $56 \pm 10^{ab}$ | $73 \pm 15^a$ | $93 \pm 9^a$ | $41 \pm 3^b$ |
| Liver SCD-1 mRNA (ΔCt/ΔCt) | $0.77 \pm 0.13^a$ | $0.20 \pm 0.04^b$ | $1.07 \pm 0.27^a$ | $2.25 \pm 0.16^c$ | $0.27 \pm 0.06^b$ |
| Liver FAS mRNA (ΔCt/ΔCt) | $0.28 \pm 0.03^a$ | $0.13 \pm 0.02^b$ | $0.36 \pm 0.08^{ac}$ | $0.48 \pm 0.07^c$ | $0.11 \pm 0.01^b$ |
| Inguinal WAT UCP1 mRNA (ΔCt/ΔCt) | $0.05 \pm 0.01^a$ | $0.14 \pm 0.03^b$ | $0.03 \pm 0.01^a$ | $0.13 \pm 0.01^c$ | $0.24 \pm 0.04^b$ |

[1]Using diets formulated by Dyets, Inc. as described above, eight mice of each genotype were fed the respective diets ad libitum for 9 weeks after weaning. After evaluation of energy expenditure for one week by indirect calorimetry, all mice were killed and tissues and blood were collected for measurement of tissue lipids and gene expression. Serum was used to measure insulin, FGF-21, and triglyceride. All biomarkers were compared by analysis of variance, followed by post hoc testing of means using the Bonferroni correction. Means within each row bearing a different superscript were significantly different at $P < 0.05$.

Figure 2:
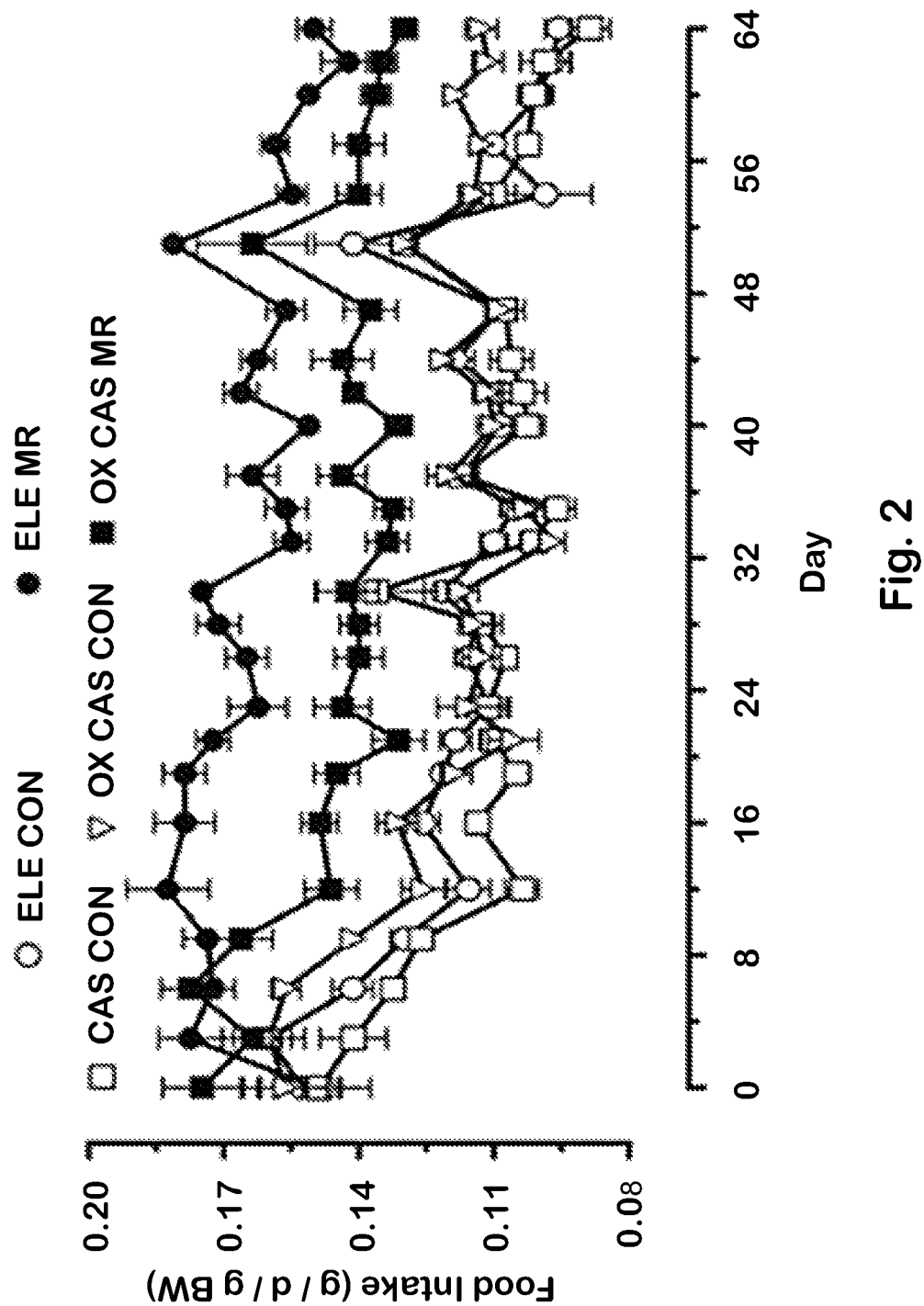
FIG. 2 depicts food intake over time in mice consuming control or MR diets.

The change in food intake over time is depicted in FIG. 2. The three control groups had similar food consumption rates. After an initial decrease in food intake by the OX-CAS-MR group on day 1, the mice in this group quickly increased food consumption, and by day 7 their food consumption was higher than that of controls and similar to that observed in the ELE-MR group. The rate of consumption decreased slightly in the OX-CAS-MR group but remained significantly higher than in the control groups for the remainder of the study.

Figure 3:
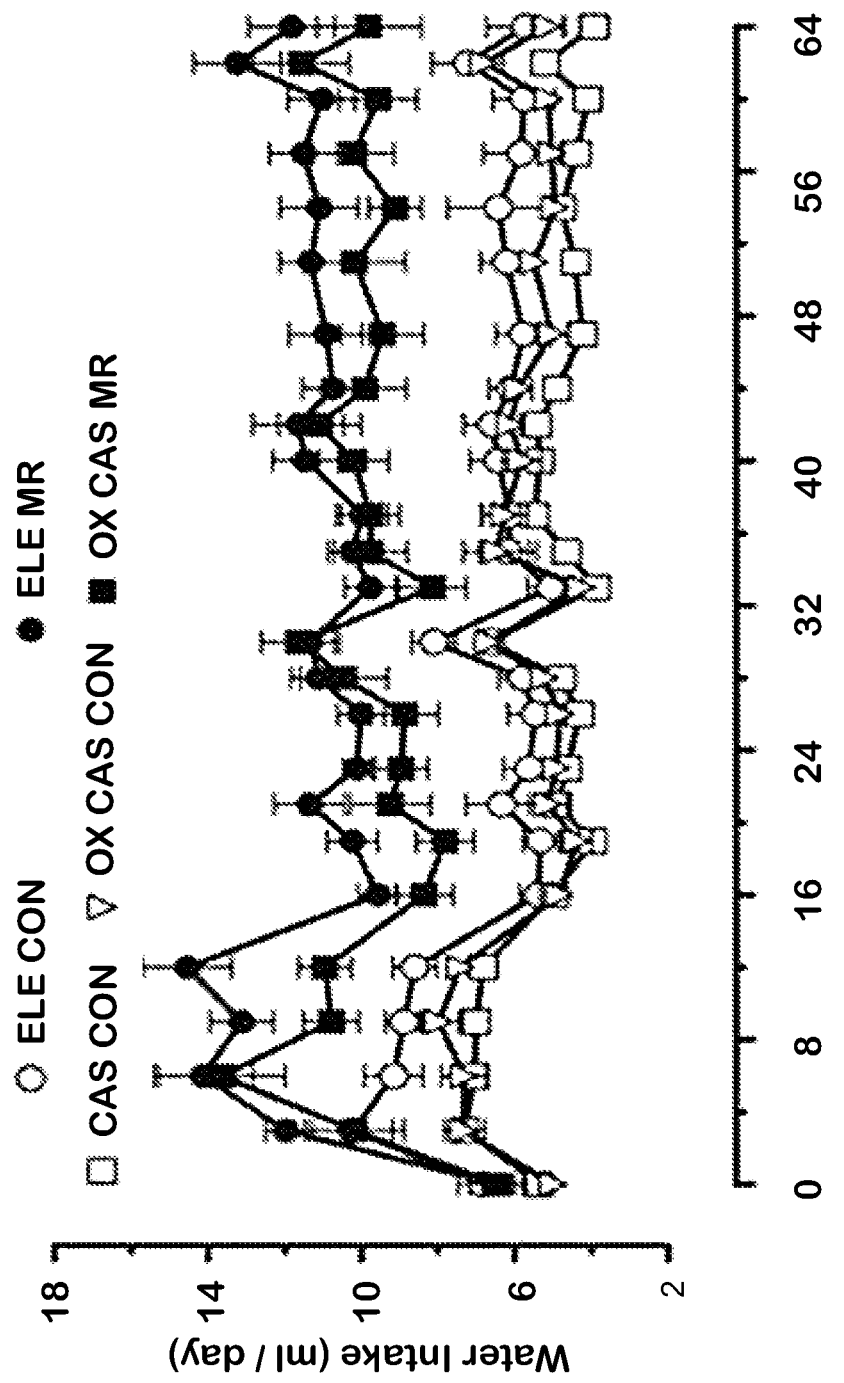
FIG. 3 depicts water intake over time in mice consuming control or MR diets.
Figure 4:
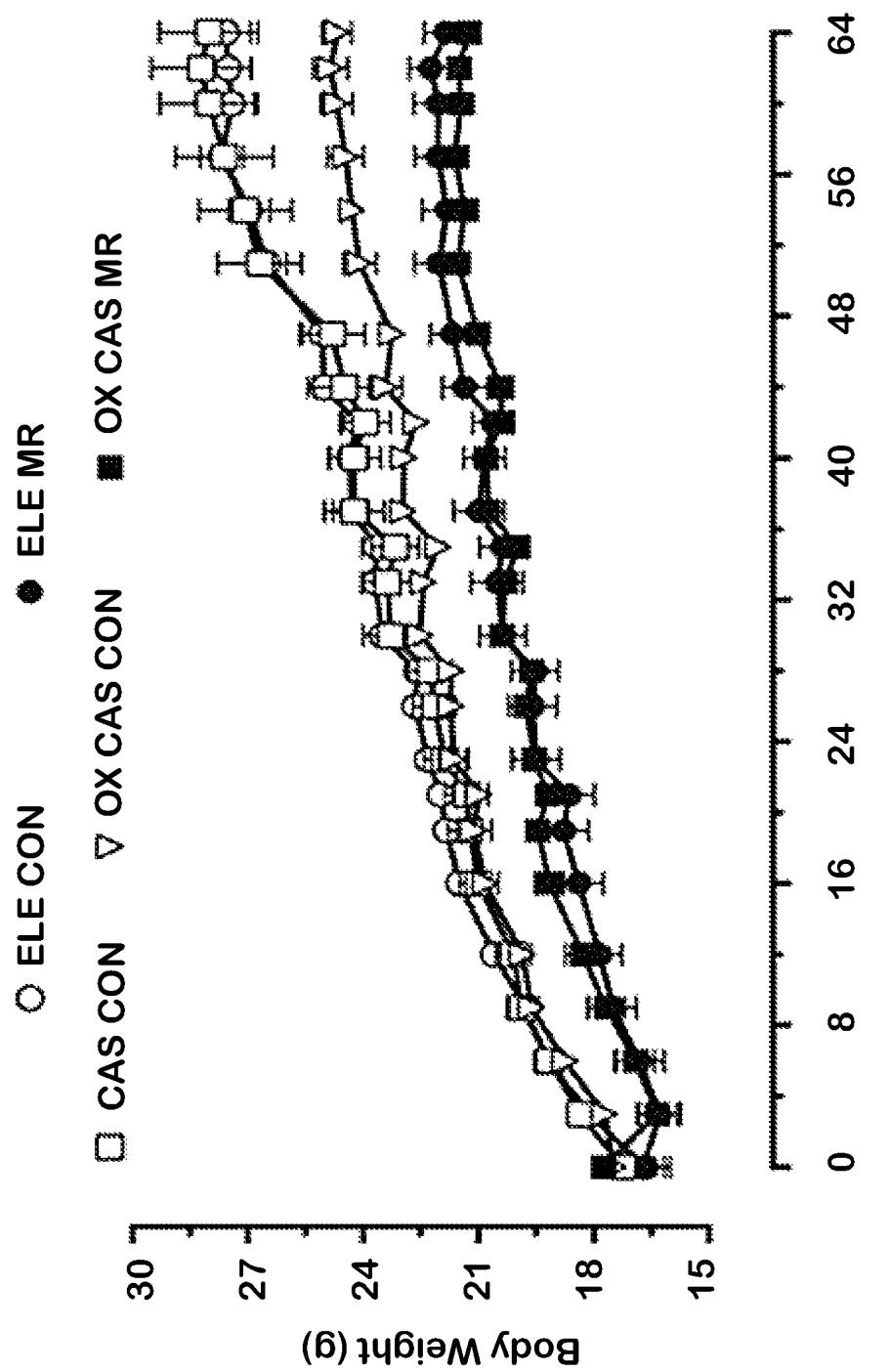
FIG. 4 depicts body weight in mice after consuming control or MR diets.

FIG. 3 illustrates that the expected increase in water intake was observed (and was almost identical) in both the ELE-MR and OX-CAS-MR groups. Despite the hyperphagia produced by dietary MR, body weight declined with both MR diets. The reduced body weight was nearly identical in the ELE-MR and OX-CAS-MR groups (FIG. 4). At the end of the study, body weights and adiposity were similarly reduced in both the ELE-MR and OX-CAS-MR groups relative to their respective controls. Table 21 also shows that the increase in energy expenditure in the ELE-MR group compared to the ELE-CON group was 41%, while the increased energy expenditure in the OX-CAS-MR group was 35% higher than in the CAS-CON group. Table 22 shows that both MR groups were hyperphagic relative to their control groups. By contrast, total activity and respiratory exchange rate did not differ significantly among the groups. The data showed that dietary methionine restriction from both the OX-CAS-MR and the ELE-MR diets resulted in nearly identical behavioral and metabolic responses.

Figure 5:
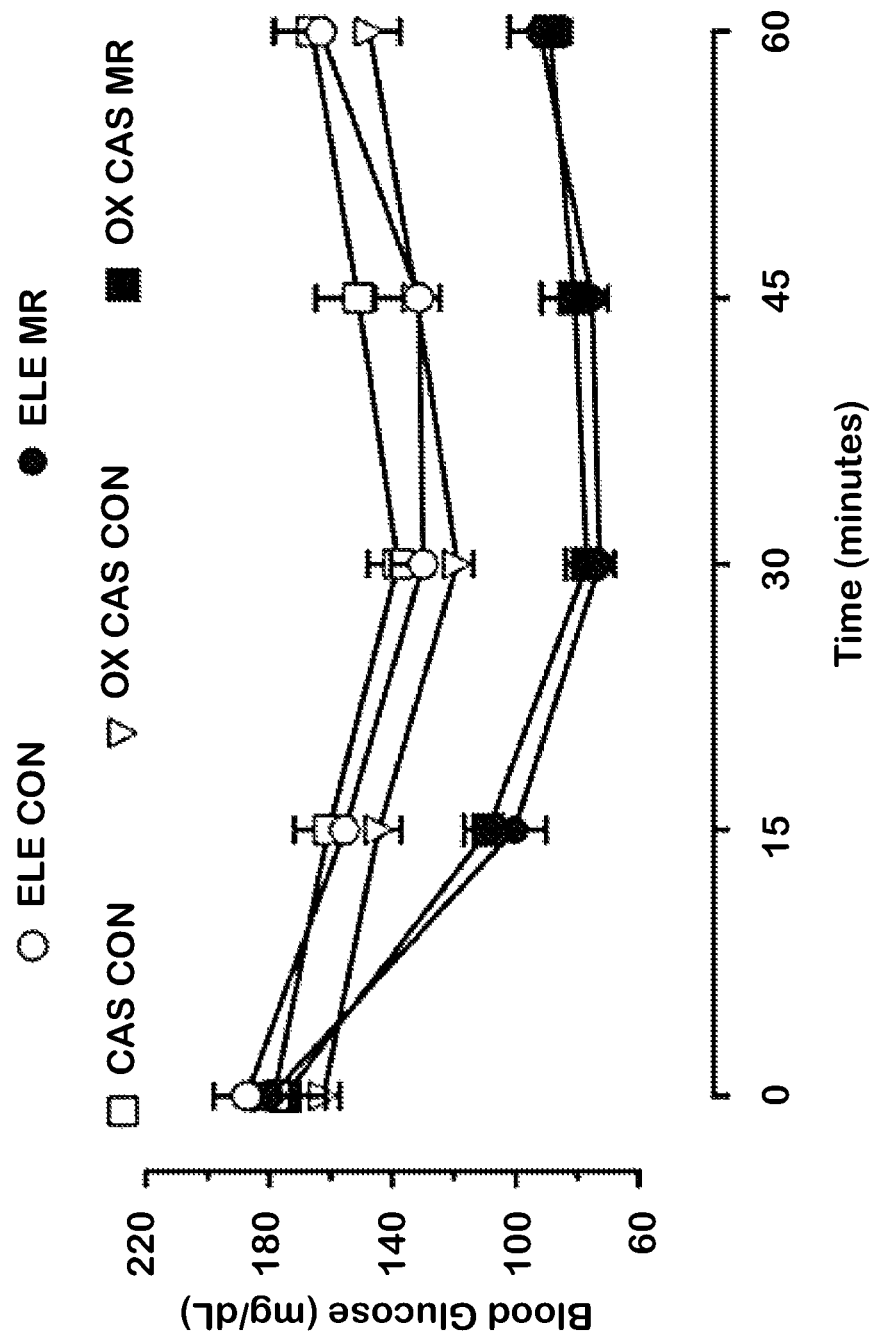
FIG. 5 depicts insulin sensitivity in mice after consuming control or MR diets.

FIG. 5 and Table 22 show that the two MR diets also produced similar improvements in insulin sensitivity. The ELE-MR and OX-CAS-MR diets both produced similar transcriptional responses in liver, similar transcriptional responses in white adipose tissue, similar serum lipid levels, and similar liver lipid levels. In summary, the data in FIGS. 2-5 and Tables 21 and 22 show that the physiological effects of dietary methionine restriction from the OX-CAS-MR diet were essentially the same as those seen with the ELE-MR diet.

EXAMPLE 11

Preferred Range of Methionine Levels in a Methionine-Restricted Diet

The lower limit for obtaining the benefit of dietary MR has been established to be about 0.85 grams methionine per 100 grams total protein. A related question is to identify an effective upper limit of methionine levels for beneficial responses. We conducted two additional studies using diets formulated with amino acids and different levels of dietary methionine. Our specific objective was to define an approximate upper effective threshold at which MR can still produce beneficial behavioral and metabolic responses.

Dyets, Inc. prepared four diets under our direction, each with a different level of dietary methionine. The compositions of the four diets are shown in Table 23. The ELE-CON (6.1 grams methionine per 100 grams total protein) diet and ELE-MR diet (1.2 grams methionine per 100 grams total protein) were negative and positive controls, respectively. The other two diets were formulated to contain 2.4 grams methionine per 100 grams total protein, or 1.8 grams methionine per 100 grams total protein.

For these experiments, we denoted the three elemental methionine diets as MR-17, MR-34, and MR-25. MR-17 had the same composition as the "ELE-MR" used in earlier experiments. As before, the Control diet (ELE-CON) contained 6.1 grams methionine per 100 grams total protein.

TABLE 23

Composition of elemental control diet and elemental diets that incrementally restricted methionine from 6.1 grams methionine per 100 grams total protein in the control diet, to 1.2, 1.8, or 2.4 grams per 100 grams total protein in the three MR diets.

| Added Component (grams) | Control Diet 6.1 g Met/100 g | MR Diet 1.2 g Met/100 g | MR Diet 1.8 g Met/100 g | MR Diet 2.4 g Met/100 g |
|---|---|---|---|---|
| L-Arginine | 11.2 | 11.2 | 11.2 | 11.2 |
| L-Lysine HCl | 18.0 | 18.0 | 18.0 | 18.0 |
| L-Histidine | 3.3 | 8.3 | 3.3 | 3.3 |
| L-Isoleucine | 8.2 | 8.2 | 8.2 | 8.2 |
| L-Valine | &2 | 8.2 | 8.2 | 8.2 |
| DL-Methionine | 8.6 | 1.7 | 2.5 | 3.4 |
| L-Threonine | 8.2 | 8.2 | 8.2 | 8.2 |
| L-Tryptophan | 1.8 | 1.8 | 1.8 | 1.8 |
| L-Phenylalanine | 11.6 | 11.6 | 11.6 | 11.6 |
| Glycine | 23.3 | 23.3 | 23.3 | 23.3 |
| L-Leucine | 11.1 | 11.1 | 11.1 | 11.1 |
| L-Glutamic Acid | 27.1 | 33.9 | 33.9 | 33.9 |
| Total Amino Acids | 140.5 | 140.5 | 140.5 | 140.5 |
| Dextrose | 200 | 200 | 200 | 200 |
| Dyetrose | 50 | 50 | 50 | 50 |
| Cornstarch | 432.5 | 432.5 | 432.5 | 432.5 |
| Corn Oil | 80 | 80 | 80 | 80 |
| Cellulose | 50 | 50 | 50 | 50 |
| Mineral Mix #200000 | 35 | 35 | 35 | 35 |
| Vitamin Mix #300050 | 10 | 10 | 10 | 10 |
| Choline Bitartrate | 2 | 2 | 2 | 2 |
| Total | 1000 | 1000 | 1000 | 1000 |

Example 12

Experiments with Methionine Levels in Mice

Twenty-four, five-week old male C57BL/6J mice were obtained from Jackson Labs and divided into three groups of 8 mice each. During their 10-day quarantine and adaptation period after arrival, all mice in all three groups received the Control diet ad libitum. After the quarantine/adaptation period, eight mice continued to receive the Control diet, eight mice received the MR-17 diet, and eight mice received the MR-34 diet. Over the subsequent 8 weeks, behavioral, metabolic, and endocrine responses were observed to evaluate the relative efficacy of restricting methionine to 2.4 versus 1.2 grams per 100 grams total protein.

Figure 6:
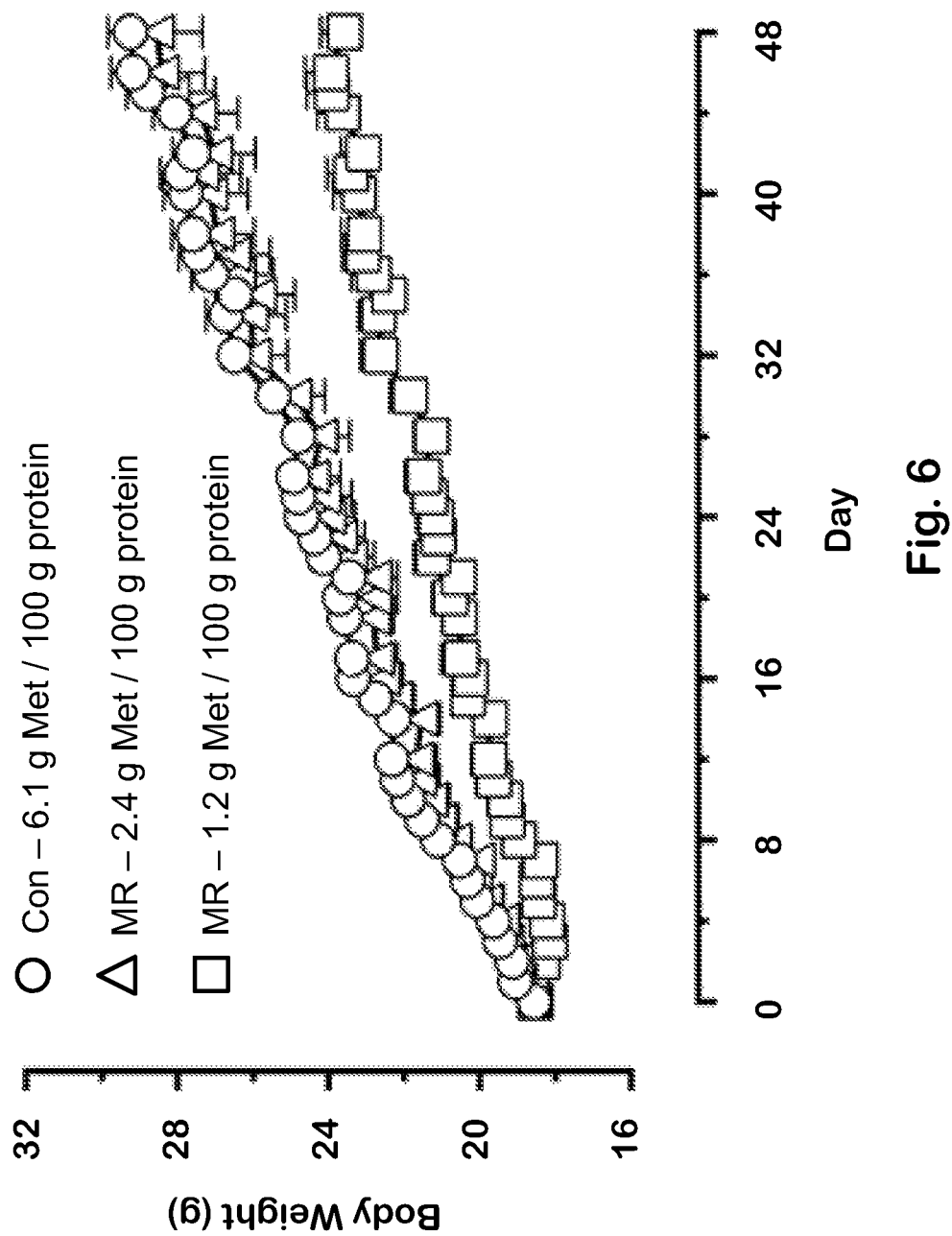
FIG. 6 depicts body weight over time in mice for various levels of dietary methionine.

Restricting dietary methionine to 1.2 grams per 100 grams total protein produced the expected increased food intake, reduced fat deposition, reduced body weight accretion, increased energy expenditure, reduced circulating lipids, reduced tissue lipids, increased insulin sensitivity, increased transcription of genes involved in lipid metabolism in white adipose tissue, and decreased transcription of genes involved in lipid metabolism in liver tissue. By contrast, restricting dietary methionine to 2.4 grams per 100 grams total protein had no significant effect on food intake, fat deposition, or body weight (FIG. 6). The MR-34 diet also had no significant effect on fasting insulin, or on transcription of genes associated with lipid metabolism. Our data provided no evidence that restricting dietary methionine to 2.4 grams per 100 grams total protein produces any of the beneficial responses seen when methionine is restricted to 1.2 grams per 100 grams total protein. Indeed, our data suggest that any such benefit is either minimal or nonexistent at 2.4 grams methionine per 100 grams total protein.

In a second experiment, after the initial quarantine/adaptation period, eight mice continued to receive the Control diet, eight mice received the MR-17 diet, and eight mice received the MR-25 diet. Over the subsequent 8 weeks, behavioral, metabolic, and endocrine responses were observed to evaluate the relative efficacy of restricting methionine to 1.8 versus 1.2 grams per 100 grams total protein.

Figure 7:
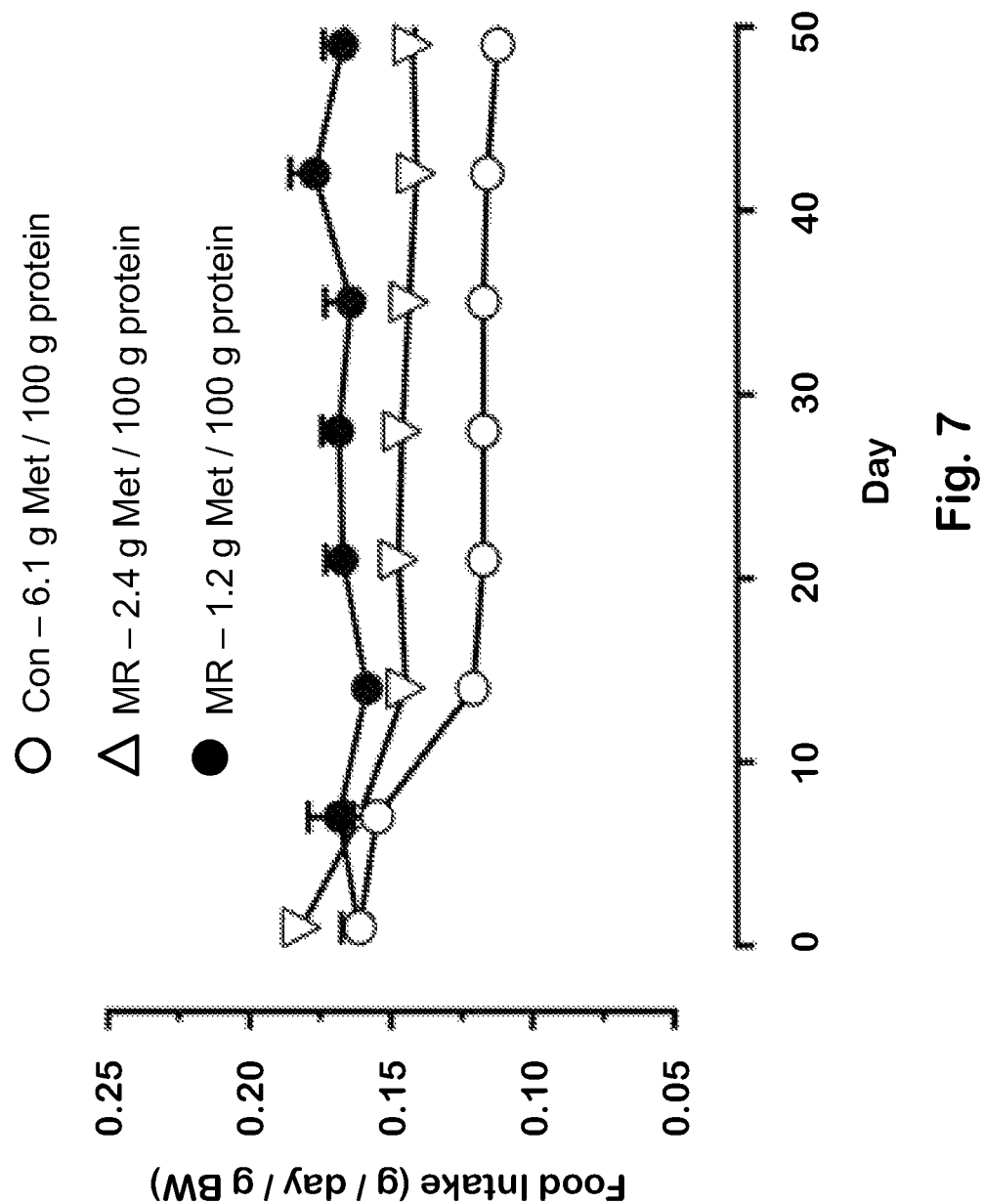
FIG. 7 depicts food intake over time in mice for various levels of dietary methionine.
Figure 8:
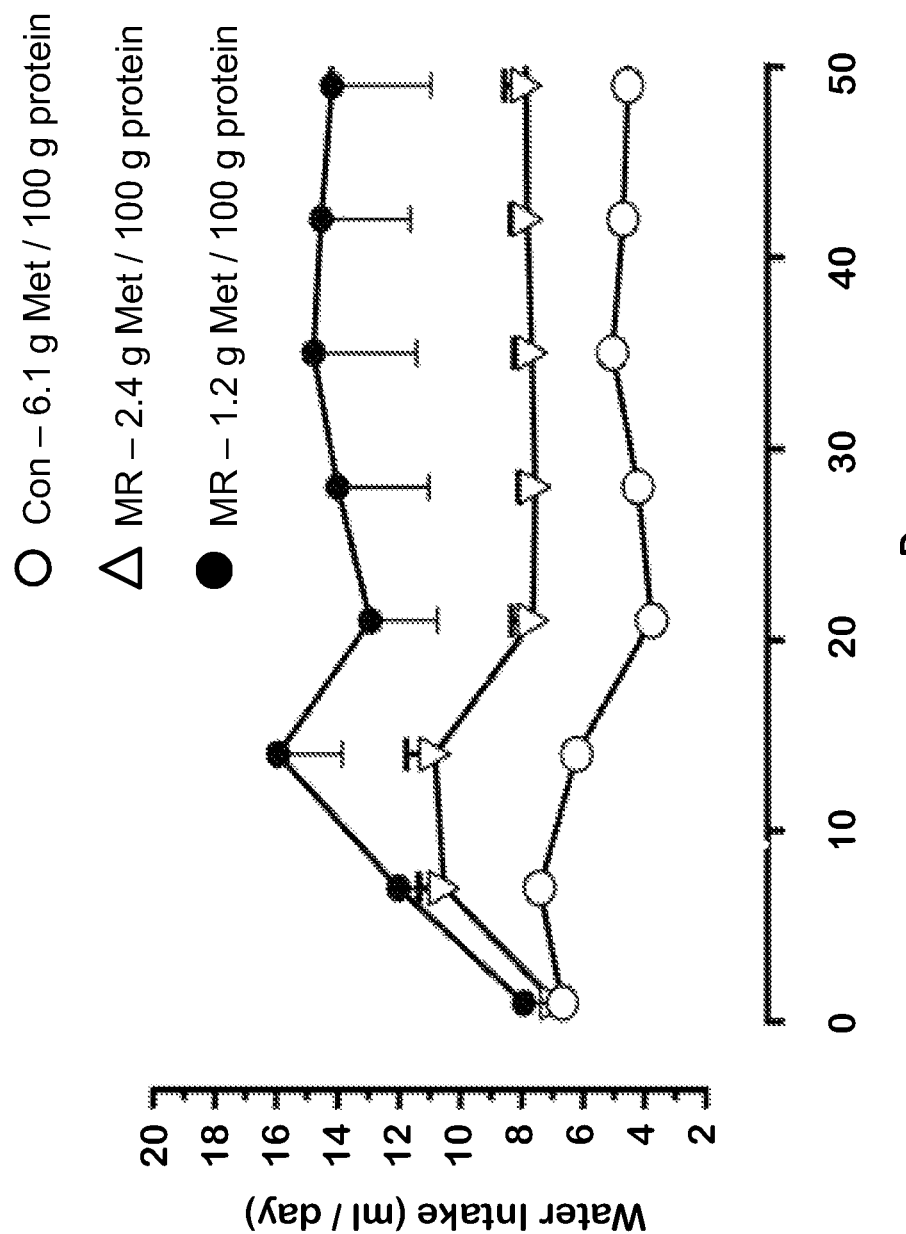
FIG. 8 depicts water intake over time in mice for various levels of dietary methionine.
Figure 9:
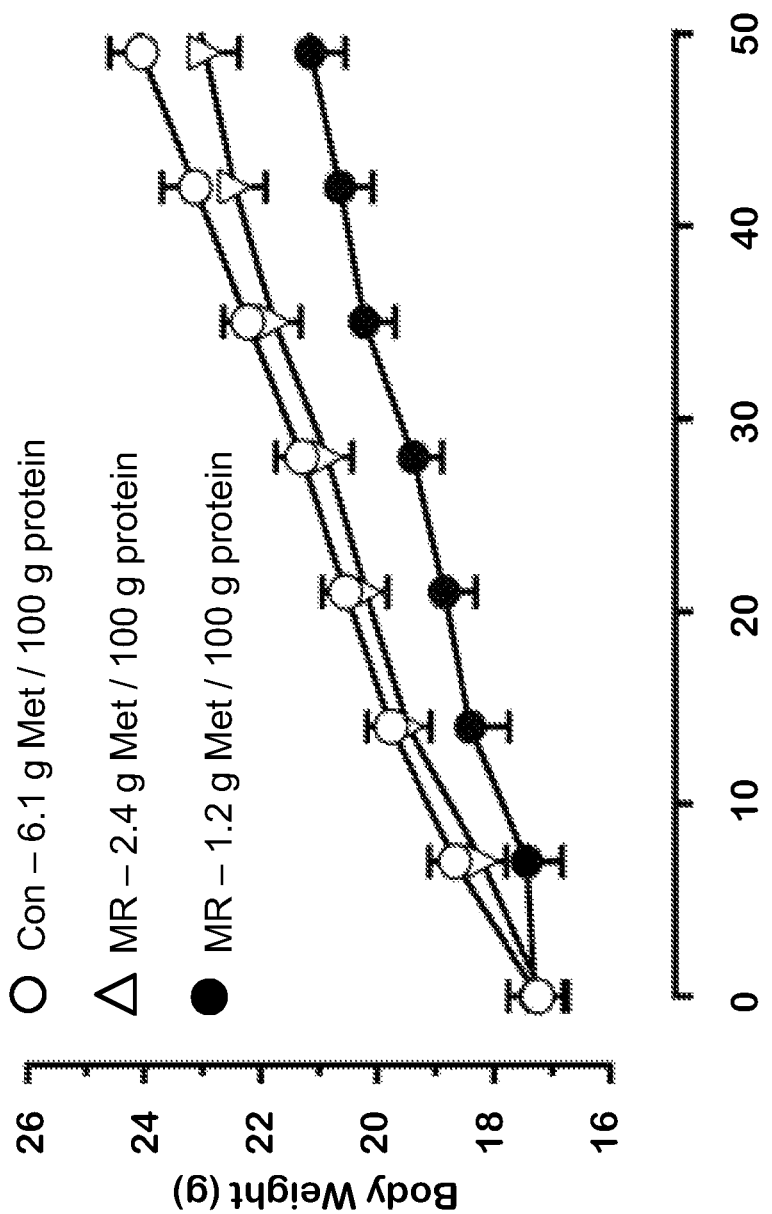
FIG. 9 depicts body weight over time in mice for various levels of dietary methionine.

The results of this experiment are shown in FIGS. 7-10 and Table 24. Unlike the MR-34 diet, a diet with 1.8 grams methionine per 100 grams total protein was effective in producing a hyperphagic response relative to the Control diet (6.1 grams methionine per 100 grams total protein). The results were intermediate between the control group response and that for the MR-17 group. The initial hyperphagic response at day 6-7 was observed in both the MR-25 and MR-17 groups. The rate of food intake by the MR-25 group for the subsequent 7 weeks was intermediate between the Control and MR-17 groups (FIG. 7). The increased water intake during the first week for MR-25 and MR-17 did not differ. Thereafter, as with food intake, the rate of water intake in the MR-25 group was intermediate between the Control and MR-17 groups (FIG. 8). The change in body weight between the Control and MR-25 groups did not differ until the last two weeks of the study, when the weights in the MR-25 group became significantly lower than those in the Control group (FIG. 9). The lower body weight for the MR-17 group became evident earlier (e.g., 3 wks), and by the end of the experiment the MR-17 body weights were 15% lower despite consuming an average of 47% more food than the Control group (Table 24).

TABLE 24

Effects of incremental dietary MR on body weight, fat mass, adiposity, energy intake, water intake, energy expenditure (EE), respiratory exchange rate (RER), activity, serum lipids, and liver triglycerides.[1,2]

| Response | Control Diet 6.1 g/100 g | MR Diet 1.8 g/100 g | MR Diet 1.2 g/100 g |
|---|---|---|---|
| Body Weight (grams) | $24.6 \pm 0.7^a$ | $23.5 \pm 0.4^{ab}$ | $21.3 \pm 0.6^b$ |
| Fat Mass (grams) | $3.87 \pm 4.20^a$ | $3.11 \pm 0.19^{ab}$ | $2.80 \pm 0.10^b$ |
| Adiposity (g fat/g BW * 100) | $15.9 \pm 0.9^a$ | $13.2 \pm 0.6^a$ | $13.4 \pm 0.4^a$ |
| Energy Intake (kJ/day/g | $1.74 \pm 0.03^a$ | $2.17 \pm 0.03^b$ | $2.57 \pm 0.14^c$ |
| Water Intake (ml/day/mouse) | $4.62 \pm 0.43^a$ | $8.03 \pm 0.85^b$ | $13.2 \pm 3.2^c$ |
| ANCOVA EE[2] (kJ/mouse-day) | $37.2 \pm 0.2^a$ | $41.8 \pm 0.2^b$ | $46.5 \pm 0.2^c$ |
| RER $VCO_2/VO_2$ | $0.93 \pm 0.00^a$ | $0.94 \pm 0.00^{ab}$ | $0.95 \pm 0.00^b$ |
| Activity X-TOT (Arb Units) | $593 \pm 19^a$ | $727 \pm 17^b$ | $574 \pm 19^a$ |
| Serum Triglyceride | $76 \pm 2^a$ | $60 \pm 5^{ab}$ | $59 \pm 4^b$ |
| Liver Triglyceride (µmol/mg) | $63 \pm 5^a$ | $47 \pm 3^8$ | $54 \pm 3^a$ |

[1]Diets were formulated by Dyets, Inc., to incrementally restrict methionine from the Control level of 6.1 to either 1.8 or 1.2 grams methionine per 100 grams total protein as described above. Eight mice of each genotype were fed the respective diets ad libitum for 8 weeks after weaning. After evaluation of energy expenditure for one week by indirect calorimetry, all mice were killed, and tissues and blood were collected for measurement of triglyceride. Oxygen consumption ($VO_2$), $CO_2$ production ($VCO_2$), and total activity were measured every 15 minutes for 72 hours. Energy expenditure and RER were calculated from $VO_2$ and $VCO_2$ by standard methods. All response variables were compared by analysis of variance, followed by post hoc testing of means using the Bonferroni correction. Means within each row bearing a different superscript were significantly different at $P < 0.05$.

[2]The repeated measures of energy expenditure (EE) per mouse were evaluated by Analysis of Covariance (ANCOVA) using lean mass, fat mass, and activity as covariates to calculate least square means to test for dietary differences. Means bearing a different superscript were significantly different at $P<0.05$.

Figure 10:
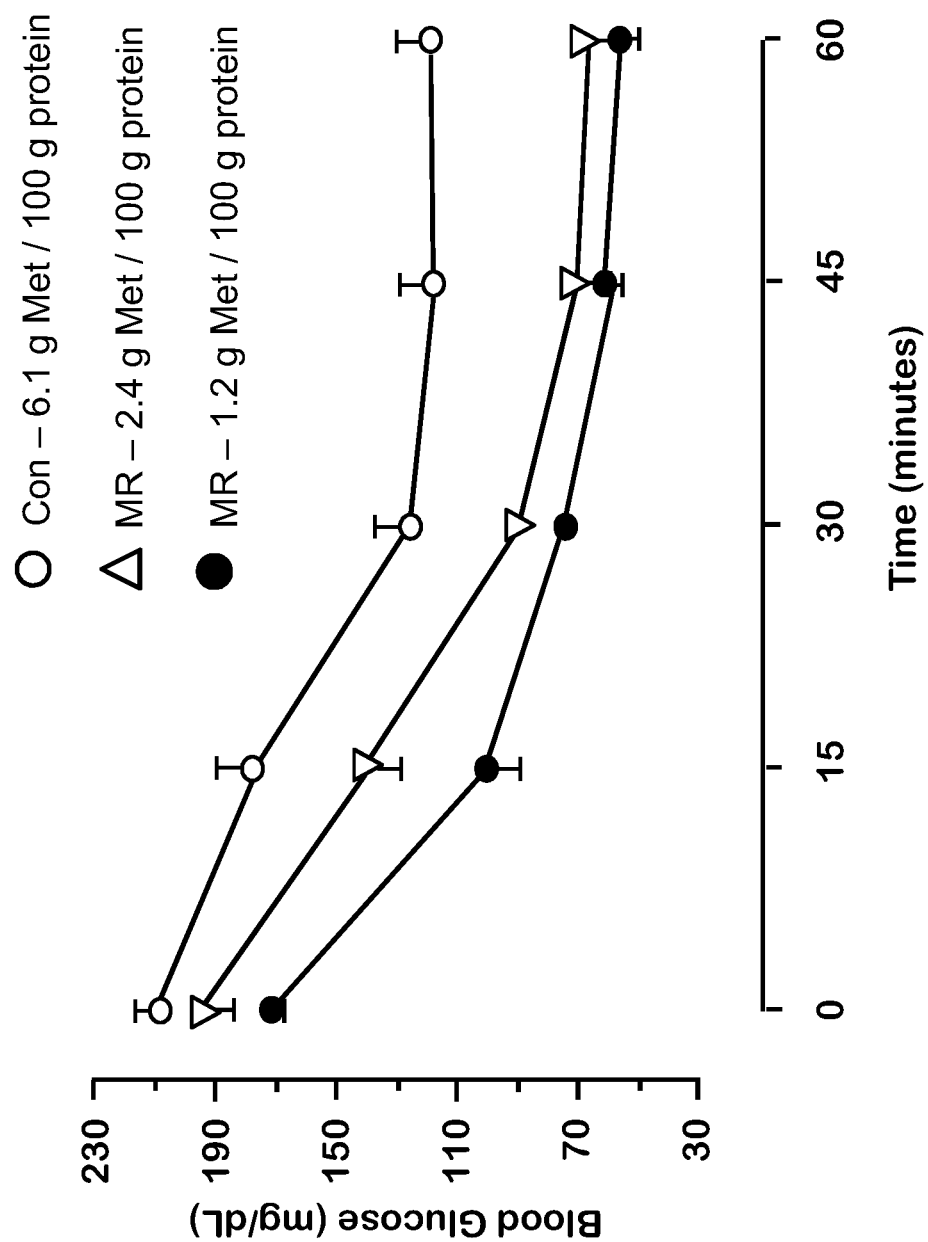
FIG. 10 depicts insulin sensitivity in mice for various levels of dietary methionine.

Table 24 summarizes the effects of incremental methionine restriction on energy balance phenotype, serum triglycerides, and liver triglycerides at the end of the study. The MR-25 diet increased energy intake by ~24%, and increased energy expenditure by ~12%. By comparison, the MR-17 diet increased energy expenditure by ~25%. The increase in water intake for the MR-25 group was intermediate between that for the Control and MR-17 groups. The effects of the MR-17 and MR-25 diets on serum and liver lipids were similar. The effects of MR-25 on insulin sensitivity were assessed in an insulin tolerance test. The results shown in FIG. 10 illustrate an intermediate improvement in the ability of insulin to reduce blood glucose in this group.

In summary, the MR-34 diet produced either minimal or no benefit. By contrast, for essentially all measured responses, the response to the MR-25 diet was intermediate between that for the Control and MR-17 groups. Thus the preferred range of methionine in an MR diet is between about 0.85 and about 1.8 grams methionine per 100 grams total protein. While there is no sharp cutoff at the upper end of the range, beneficial effects decline at methionine levels above about 1.8 grams per 100 grams total protein. At the lower end, deleterious effects begin for methionine levels much below about 0.85 grams per 100 grams total protein, making the preferred range from about 0.85 to about 1.8 grams methionine per 100 grams total protein; preferably from about 1.0 to about 1.4 g/100 g; and most preferably about 1.2 grams methionine per 100 grams total protein.

The earliest response to dietary MR that we have observed to date is a consistent, profound increase in water intake that is evident as early as about 12 hours after starting the diet. This 2- to 3-fold increase in water intake continues as long as the MR diet continues.

We have observed in pre-clinical studies in mice that adding even a small amount of cysteine to an MR diet reverses the beneficial metabolic effects the MR diet would otherwise produce. After oxidizing foods as otherwise described above, we have added back incremental amounts of cysteine to the MR diet (MR+0.7 g cysteine per 100 g total protein, MR+1.4 g cysteine per 100 g total protein, and MR+2.8 g cysteine per 100 g total protein). Compared to MR alone, all three diets with added cysteine fully reversed the beneficial effects of MR alone on growth and adiposity. The presence of even small amounts of cysteine was found to be undesirable. For comparison, the Hominex™ diet contains 0.9 g cysteine per 100 g of the Hominex powder (3.0 g cysteine per 100 g total protein). Even with the degree of MR obtained with Hominex™, our findings suggest that the presence of significant amounts of cysteine in Hominex™ likely limit its overall efficacy. (preliminary results, data not shown)

In clinical use, patients are optionally given a food list from which they may choose to supplement the methionine/cysteine-depleted foods of the present invention. It is preferred that such supplemental foods should be naturally low in methionine and cysteine, but they will often increase a patient's total methionine and cysteine consumption at least somewhat. It is our current expectation that it is the total consumption of methionine and cysteine that determine whether beneficial responses will be seen in an MR diet. Thus, the amount of methionine added back to an oxidized food may be lower in the case of such supplementation than it would be if the oxidized food constituted the entire diet. Depending on the quantity and identity of the supplemental foods, in some cases it may even be desirable to add no methionine at all back to the oxidized food. As one example, if methionine were restricted to 1.8 g per 100 g total protein (see Table 24 & FIG. 10), an intermediate phenotype and response are expected as compared to methionine restriction to 1.2 g per 100 g total protein. We have observed in preliminary studies that adding back as little as 0.7 g cysteine per 100 g total protein to a diet with 1.2 g methionine per 100 g total protein appears to be enough to reverse the beneficial effects. We therefore expect that adding back even a very small amount of cysteine to a diet with 1.8 g methionine per 100 g protein would reverse its partial beneficial effects. However, if methionine were restricted to 1.2 g per 100 g total protein, it is possible that adding back .35 g cysteine per 100 g total protein would still produce partial beneficial effects, perhaps comparable to the effects seen with 1.8 g methionine per 100 g protein alone. We hypothesize that if methionine restriction was more severe, say to 0.85 g methionine per 100 g protein, the amount of cysteine that could be tolerated without reversing the beneficial effects of the restricted methionine would be greater. For example, we hypothesize, without wishing to be bound by this hypothesis, that a diet with 0.85 g methionine per 100 g protein would tolerate as much as 0.7 g cysteine per 100 g total protein without fully reversing the beneficial effects. Optionally, the final level of methionine in the oxidized food could be 0.85, 0.7, 0.35, or even 0.0 gram methionine per 100 gram total protein, depending on the amount of methionine and cysteine in the supplemental foods. We further hypothesize, without wishing to be bound by this hypothesis, that in order for the beneficial metabolic effects to be seen, the sum of the concentrations of methionine and cysteine should be below a cutoff that will be determined through further testing, and the expected value of this cutoff is about 1.8 grams of (methionine+cysteine) per 100 grams of total protein. The actual cutoff value may be a little higher or lower, e.g., in the range from about 1.5 to about 2.1 grams per 100 grams total protein. Given the guidance provided by the present disclosure, a person of ordinary skill in the art may readily determine a suitable level of amount of methionine (if any) to add back to a particular oxidized food, in view of the levels of methionine and cysteine/cystine present in a patient's supplemental food(s).

Methionine-restricted foods have applications both for humans and for animals, such as companion animals, especially mammals. Methionine-restricted diets for pets, particularly cats and dogs, will produce beneficial effects for animals who are obese or metabolically unhealthy. Recall that methionine restriction in rodents has been observed to produce a 25% increase in longevity. A diet that inhibited obesity and insulin resistance in pets will improve their health and increase longevity.

The complete disclosures of all references cited in this application are hereby incorporated by reference. Also incorporated by reference is the complete disclosure of U.S. provisional application 61/831,189, filed 5 Jun. 2013. Specifically incorporated by reference are each of the Appendices to the provisional priority application. In the event of an otherwise irreconcilable conflict, however, the present specification shall control.

What is claimed:

1. A method for lowering the level of methionine in a food, and for treating a human patient or a veterinary patient; said method comprising the steps of:
   (a) providing a food that comprises one or more proteins containing both methionine and cysteine; wherein the food comprises one or more items selected from the group consisting of milk, nonfat dry milk, yogurt, ice cream, cheese, dairy products, eggs, egg whites, egg yolks, beans, bread, cakes, crackers, cookies, biscuits, pasta, flour, rice, corn meal, cereal products, and grain proteins;
   (b) oxidizing or partially oxidizing the methionine and the cysteine in the food with an oxidizing agent to produce a methionine-depleted food; wherein the methionine-depleted food contains between 0.85 gram and 1.8 gram methionine per 100 gram total protein; and wherein the methionine-depleted food contains no more than 1.8 gram combined (methionine plus cysteine) per 100 gram total protein; wherein the oxidizing agent comprises ozone or hydrogen peroxide; and wherein the one or more proteins in the methionine-depleted food retain the one or more proteins' naturally-occurring primary structure; and wherein the palatability of the methionine-depleted food is greater than the palatability of a product comprising a mixture of free amino acids whose concentrations match the amino acid levels of the methionine-depleted food; and
   (c) feeding the methionine-depleted food to a human patient or veterinary patient for a period of time, until at least one condition of the patient is thereby improved;
   wherein the improved condition is selected from the group consisting of increased energy expenditure, reduced fat deposition, reduced body weight, and enhanced insulin sensitivity.

2. The method of claim 1, wherein: if the methionine-depleted food otherwise has less than 0.85 gram methionine per 100 gram total protein after the methionine is oxidized or partially oxidized, then the method comprises the additional step of adding methionine to the methionine-depleted food until the methionine-depleted food contains between 0.85 gram and 1.8 gram methionine per 100 gram total protein.

3. The method of claim 1, wherein: if the methionine-depleted food has less than 0.5 gram tryptophan per 100 gram total protein, then the method comprises the additional step of adding tryptophan to the methionine-depleted food until the methionine-depleted food contains at least 0.5 gram tryptophan per 100 gram total protein.

4. The method of claim 3, wherein the total concentration of tryptophan in the methionine-depleted food following said adding step is approximately equal to the concentration of tryptophan in the food before said oxidizing or partially oxidizing step.

5. The method of claim 1, wherein: if the methionine-depleted food has less than 5 gram lysine per 100 gram total protein, then the method comprises the additional step of adding lysine to the methionine-depleted food until the methionine-depleted food contains at least 5 gram lysine per 100 gram total protein.

6. The method of claim 5, wherein the total concentration of lysine in the methionine-depleted food following said adding step is approximately equal to the concentration of lysine in the food before said oxidizing or partially oxidizing step.

7. The method of claim 1, wherein the oxidizing agent is ozone.

8. The method of claim 1, wherein the oxidizing agent is hydrogen peroxide; and wherein said method additionally comprises the step of reacting the methionine-depleted food with peroxidase to lower the concentration of hydrogen peroxide in the methionine-depleted food.

9. The method of claim 1, wherein the oxidizing agent is ozone, and wherein moisture is added during said oxidizing step to accelerate the oxidation of methionine by the ozone.

10. The method of claim 1, wherein the food comprises one or more items selected from the group consisting of milk, nonfat dry milk, yogurt, ice cream, cheese, and dairy products.

11. The method of claim 1, wherein the food comprises one or more items selected from the group consisting of eggs, egg whites, egg yolks, and beans.

12. The method of claim 11, wherein the food comprises eggs, egg whites, or egg yolks.

13. The method of claim 11, wherein the food comprises beans.

14. The method of claim 1, wherein the food comprises one or more items selected from the group consisting of bread, cakes, crackers, cookies, biscuits, pasta, flour, rice, corn meal, cereal products, and grain proteins.

15. The method of claim 14, wherein the food comprises one or more cereal products.

16. The method of claim 14, wherein the food comprises one or more grain proteins.

17. The method of claim 14, wherein the food comprises flour.

18. The method of claim 14, wherein the food comprises rice.

19. The method of claim 14, wherein the food comprises corn meal.

* * * * *